(12) United States Patent
Jiang et al.

(10) Patent No.: US 12,496,573 B2
(45) Date of Patent: Dec. 16, 2025

(54) CATALYST AND CATALYTIC OXIDATION-DEOXIDATION METHOD FOR UNSATURATED HYDROCARBON-CONTAINING GAS

(71) Applicants: CHINA PETROLEUM & CHEMICAL CORPORATION, Beijing (CN); SINOPEC RESEARCH INSTITUTE OF SAFETY ENGINEERING CO., LTD., Shandong (CN)

(72) Inventors: Jie Jiang, Shandong (CN); Song Wen, Shandong (CN); Lei Zhao, Shandong (CN); Wei Xu, Shandong (CN); Bing Sun, Shandong (CN); Changsheng Zhang, Shandong (CN); Jinchong Zhao, Shandong (CN); Feng Sun, Shandong (CN); Yunfeng Zhu, Shandong (CN); Yuxia Zhang, Shandong (CN)

(73) Assignees: CHINA PETROLEUM & CHEMICAL CORPORATION, Beijing (CN); SINOPEC RESEARCH INSTITUTE OF SAFETY ENGINEERING CO., LTD., Shandong (CN)

( * ) Notice: Subject to any disclaimer, the term of this patent is extended or adjusted under 35 U.S.C. 154(b) by 682 days.

(21) Appl. No.: 17/760,386
(22) PCT Filed: Jan. 26, 2021
(86) PCT No.: PCT/CN2021/073728
§ 371 (c)(1),
(2) Date: Aug. 9, 2022
(87) PCT Pub. No.: WO2021/159951
PCT Pub. Date: Aug. 19, 2021

(65) Prior Publication Data
US 2023/0129017 A1    Apr. 27, 2023

(30) Foreign Application Priority Data
Feb. 11, 2020    (CN) .......................... 202010087815.3

(51) Int. Cl.
*B01J 21/04*    (2006.01)
*B01D 53/46*    (2006.01)
(Continued)

(52) U.S. Cl.
CPC .......... *B01J 23/8946* (2013.01); *B01D 53/46* (2013.01); *B01D 53/86* (2013.01); *B01J 35/396* (2024.01);
(Continued)

(58) Field of Classification Search
CPC . B01J 21/04; B01J 21/063; B01J 21/08; B01J 21/12; B01J 21/18; B01J 23/8946;
(Continued)

(56) References Cited

U.S. PATENT DOCUMENTS 6,245,307 B1 * 6/2001 Inui .................... B01D 53/9418
423/213.7
2005/0204919 A1  9/2005 Spadaccini et al.
(Continued)

FOREIGN PATENT DOCUMENTS

CN    101613627 A    12/2009
CN    102041067 A     5/2011
(Continued)

OTHER PUBLICATIONS

Wen, Song et al.; "Research Status of the Deoxidizer for Industrial Gas Mixtures"; Industrial Catalysis; vol. 23, No. 3; Mar. 31, 2015; pp. 167-171.
(Continued)

*Primary Examiner* — Cam N. Nguyen
(74) *Attorney, Agent, or Firm* — NKL Law; Allen Xue

(57) ABSTRACT

A catalyst for catalytic oxidation-deoxidation method of unsaturated hydrocarbon-containing gas has a carrier, an active component, a first co-agent component, and a second co-agent component loaded on the carrier respectively. The
(Continued)

active component is one or more selected from the group consisting of oxides of Pt, Pd, Ru, Rh, Ag and Ir. The first co-agent component has one or more selected from the group consisting of a rare earth metal element, a group IVB metal element and a group VIII metal element; and the second co-agent component has one or more alkali metal element and alkaline earth metal element. The deoxidation method using the catalyst eliminates the need to add a reducing gas such as $H_2$, allows hydrocarbons to react directly with oxygen to produce $CO_2$ and $H_2O$, achieves the goal of deoxidating a hydrocarbon-containing tail gas, and can prevent the generation of carbon deposits.

20 Claims, 16 Drawing Sheets

(51) Int. Cl.
| | |
|---|---|
| *B01D 53/86* | (2006.01) |
| *B01J 21/08* | (2006.01) |
| *B01J 21/12* | (2006.01) |
| *B01J 21/18* | (2006.01) |
| *B01J 23/89* | (2006.01) |
| *B01J 35/30* | (2024.01) |
| *B01J 35/64* | (2024.01) |
| *B01J 37/02* | (2006.01) |

(52) U.S. Cl.
CPC .......... *B01J 35/647* (2024.01); *B01J 37/024* (2013.01); *B01J 2235/30* (2024.01)

(58) Field of Classification Search
CPC ...... B01J 35/396; B01J 35/647; B01J 37/024; B01D 53/46; B01D 53/86
See application file for complete search history.

(56) References Cited

U.S. PATENT DOCUMENTS

| | | | |
|---|---|---|---|
| 2006/0258532 A1* | 11/2006 | Thorsteinson | ....... B01J 37/0207 502/439 |
| 2006/0293180 A1* | 12/2006 | Thorsteinson | ........... B01J 21/04 502/439 |
| 2011/0082029 A1* | 4/2011 | Thorsteinson | ........... B01J 37/06 502/201 |
| 2012/0003132 A1 | 1/2012 | Wang et al. | |
| 2018/0025853 A1 | 1/2018 | Bondavalli et al. | |

FOREIGN PATENT DOCUMENTS

| | | |
|---|---|---|
| CN | 103157471 A | 6/2013 |
| CN | 103285854 A | 9/2013 |
| CN | 106994319 A | 8/2017 |
| CN | 107511147 A | 12/2017 |
| CN | 109985620 A | 7/2019 |
| CN | 110013887 A | 7/2019 |
| CN | 110559842 A | 12/2019 |
| CN | 110559843 A | 12/2019 |
| CN | 110563538 A | 12/2019 |
| JP | 2001000865 A | 1/2001 |
| WO | 0059630 A1 | 10/2000 |
| WO | 2011009283 A1 | 1/2011 |

OTHER PUBLICATIONS

Chen, Shuang et al.; "Green and Renewable Bio-diesel Produce from Oil Hydrodeoxygenation: Strategies for Catalyst Development and Mechanism"; Renewable & Sustainable Energy Reviews; vol. 101; 2019; pp. 568-589.

* cited by examiner

CATALYST AND CATALYTIC OXIDATION-DEOXIDATION METHOD FOR UNSATURATED HYDROCARBON-CONTAINING GAS

CROSS REFERENCE TO RELATED APPLICATIONS

This application is a U.S. national stage entry of PCT International Application No. PCT/CN2021/073728, filed on Jan. 26, 2021, which claims priority to the Chinese patent application No. 202010087815.3, filed on Feb. 11, 2020, the content of which is incorporated herein by reference in its entirety.

FIELD

The present disclosure relates to the technical field of chemical tail gas processing, and in particular to a catalyst, and a catalytic oxidation-deoxidation method for an unsaturated hydrocarbon-containing gas using the catalyst.

BACKGROUND

Oxygen-containing organic hydrocarbon gas or tail gas is the common gas during current chemical production, storage and transportation processes, such as an organic tail gas in the oxidation and peroxidation processes, oil tank farm communication system tail gas and landfill gas, it often brings about an explosion risk due to its high oxygen content; and the industry standard SH 3009-2013 "Design specifications for combustible gas discharge system in petrochemical engineering" Version 5.3.1 stipulates that "combustible gas with an oxygen content greater than 2% by volume (v %)" should not be discharged into a whole plant combustive gas discharge system, such as a torch, an incinerator and the like. Therefore, deoxygenation treatment of oxygen-containing organic gas or tail gas is required so as to reduce the explosion risk, recycle organic gas or ensure that oxygen-containing organic tail gas meets the emission requirements. In regard to epoxypropane devices, including conventional chlorohydrin method epoxypropane device, and epoxypropane manufacturing device with hydrogen peroxide process used in recent years, the oxygen content in the propylene tail gas fluctuates within a range of 0.2-8%, it is required according to the design specifications that the gas shall not be discharged into a combustive gas discharge system, the oxygen content shall be decreased to below 0.5% for emission, or that the oxygen content is further reduced to 0.1% or lower to facilitate recycling.

The currently available deoxygenation technologies are mainly composed of physical variable-pressure adsorption deoxygenation, chemical adsorption deoxygenation, activated carbon combustion deoxygenation, catalytic combustion deoxygenation and catalytic oxidation-deoxidation, wherein physical variable-pressure adsorption deoxygenation and chemical adsorption deoxygenation have small loads and are suitable for removal of trace oxygen; activated carbon combustion deoxygenation requires a high temperature and large energy consumption; catalytic combustion deoxygenation technologies mostly require addition of reducing gas such as $H_2$, and the separation of the reducing gas becomes a difficult problem; current catalytic oxidation-deoxidation technologies are mainly for methane-containing gases such as coal seam gas and landfill gas, and the deoxygenation technologies for olefins (e.g., ethylene, propylene) are only suitable for removal of ppm-level trace oxygen, and catalytic oxidation-deoxidation technologies for olefins (e.g., ethylene and propylene) and alkynes with higher oxygen content are not known, while olefins and alkynes are prone to generate carbon deposits on catalyst surface at a certain temperature, its requirements for catalytic oxidation-deoxidation technologies are different from those of the catalytic oxidation-deoxidation technologies for methane.

SUMMARY

The present disclosure aims to provide a catalyst, and a catalytic oxidation-deoxidation method for an unsaturated hydrocarbon-containing gas using the catalyst. An use of the catalyst of the present disclosure can reduce the production of carbon deposits, and the catalytic oxidation-deoxidation method of the present disclosure obviates the need to add a reducing gas such as $H_2$, allows hydrocarbons to react directly with oxygen to produce $CO_2$ and $H_2O$, achieves the goal of deoxidating a hydrocarbon-containing tail gas, and the reaction apparatus is safe, environmentally friendly and energy-efficient.

The present disclosure provides a catalyst comprising a carrier as well as an active component, a first co-agent component and a second co-agent component loaded on the carrier, wherein the active component is one or more selected from the group consisting of oxides of Pt, Pd, Ru, Rh, Ag and Ir; the first co-agent component comprises one or more selected from the group consisting of a rare earth metal element, a group IVB metal element and a group VIII metal element; and the second co-agent component comprises one or more selected from the group consisting of an alkali metal element and an alkaline earth metal element;

along a radial direction from a core of the carrier to the outer surface of the carrier, the content of said active component is gradually increased and then gradually decreased to form a peak shape distribution, the content of said first co-agent component is gradually increased and then gradually decreased to form a peak shape distribution, the content of said second co-agent component is gradually increased, and the peak value of the content of said active component is 0.2 wt % or more;

said active component is contained in an amount of 0.05-2 wt % in terms of the metallic element, said first co-agent component is contained in an amount of 0.1-3 wt % in terms of the oxide, and said second co-agent component is contained in an amount of 1-7 wt % in terms of the oxide, based on the dry weight of the catalyst.

Preferably, the carbon deposits percentage content by mass y of the catalyst measured in a propylene atmosphere at a pressure of 0.6 MPa and a temperature of 573.15K has the following characteristics:

$$y=0.9y1-1.1y1, \quad y1=(-0.0029+0.3748 \times t^{0.3013})/100$$

wherein t: reaction time, within a range of 100-2,000 h;

wherein the catalyst has a carbon deposits percentage content by mass being 0.2% or less before measurement.

Preferably, the saturated oxygen adsorption amount q of the catalyst after hydrogen reduction under a normal pressure and a temperature of 473.15K has the following characteristics:

$$q=0.8q1-1.2q1, \quad q1=a+b \times T^c+d \times T^e$$

q: saturated adsorption amount of oxygen, mL/g;
T: adsorption temperature, within a range of 323.15-623.15K;

a=−0.0685; b=7.016×10⁻⁶; c=2.06; d=−5.83×10⁻⁸; e=2.76.

Preferably, the first co-agent component comprises one or more selected from the group consisting of a group IVB metal element and a group VIII metal element, and the second co-agent component comprises an alkali metal element; further preferably, the first co-agent component is one or more selected from the group consisting of ferric oxide, cobalt oxide, nickel oxide and titanium oxide, and the second co-agent component is sodium oxide; and further more preferably, the weight ratio of the first co-agent component to the second co-agent component is 1:20-220, preferably 1:60-200.

Preferably, the catalyst has a specific surface area of 100-260 m$^2$/g and a pore volume of 0.2-0.7 cm$^3$/g; the mesopores with a pore size more than 2 nm and 50 nm or less constitute 2-40% of the total pore volume, and the macropores with a pore size more than 50 nm and 200 nm or less constitute 50-90% of the total pore volume.

Preferably, the carrier is one or more selected from the group consisting of alumina, silica, titania, molecular sieves and carbon nanotubes.

Preferably, the content of the active component having a dispersion size less than 10 nm is 80 wt % or more of the total amount of the active component.

The present disclosure also provides a catalytic oxidation-deoxidation method for an unsaturated hydrocarbon-containing gas comprising an unsaturated hydrocarbon and oxygen, the method comprises contacting the unsaturated hydrocarbon-containing gas with a catalyst and performing a catalytic oxidation process to remove oxygen from the unsaturated hydrocarbon-containing gas;

wherein the catalyst is said catalyst of the present disclosure, the contacting conditions comprise that the unsaturated hydrocarbon-containing gas has a hourly volumetric space velocity of 200-50,000 h⁻¹, preferably 200-20,000 h⁻¹, a pressure of 0.01-20 MPa, a linear velocity of 0.02-10 m/s, and a product of the pressure and the linear velocity being within a range of 0.1-5 MPa·m/s.

Preferably, the unsaturated hydrocarbon-containing gas has a hourly volumetric space velocity of 500-20,000 h⁻¹, preferably 500-10,000 h⁻¹, a pressure of 0.4-10 MPa, a linear velocity of 0.02-5 m/s, and a product of the pressure and the linear velocity being within a range of 0.2-5 MPa·m/s.

Preferably, the method further comprises the following steps:

(1) Subjecting the gas obtained from catalytic oxidation reaction to a temperature reduction and a gas-liquid separation;

(2) Separating the gas phase obtained from the gas-liquid separation to produce at least a portion of the unsaturated hydrocarbons.

Preferably, the method further comprises prior to the catalytic oxidation, performing heat exchange between the unsaturated hydrocarbon-containing gas and the gas obtained from the catalytic oxidation reaction.

Preferably, the unsaturated hydrocarbons are unsaturated hydrocarbons of C4 or fewer carbon atoms, preferably one or more selected from the group consisting of ethylene, propylene, 1-butene, 2-butene, isobutylene, 1,3-butadiene, acetylene, propyne, 1-butyne and 2-butyne.

Preferably, the reactor inlet temperature is within a range of 60-400° C., the reactor outlet temperature is within a range of 100-600° C.

Preferably, the reactor inlet temperature is within a range of 100-380° C., the reactor outlet temperature is within a range of 150-550° C.

Preferably, said catalytic oxidation reaction is carried out in a fixed bed reactor.

Preferably, the method further comprises a safety control process comprising an interlock-start alarm step, wherein the interlock-start alarm step comprises determining whether the reactor inlet temperature, the reactor outlet temperature, the feed gas oxygen content, the tail gas oxygen content reach the corresponding alarm value or interlock value, and performing alarm interlock control.

Preferably, the low alarm value of the reactor inlet temperature is 60-90° C., the low interlock value of the reactor inlet temperature is 40-60° C., the high alarm value of the reactor outlet temperature is 580-610° C., the high interlock value of the reactor outlet temperature is 610-650° C., the high alarm value of the feed gas oxygen content is 7.5-8.5% by volume, the high interlock value of the feed gas oxygen content is 8.5-10% by volume, and the high alarm value of the tail gas oxygen content is 0.2-0.3% by volume.

Preferably, the unsaturated hydrocarbon-containing gas comprises 0.2-8% of oxygen and 5-99% of unsaturated hydrocarbons in terms of the percent concentration by volume.

The catalyst of the present disclosure can reduce the generation of carbon deposits. In addition, the catalytic oxygen-deoxygenation method of the present disclosure obviates the need to add a reducing gas such as $H_2$, allows the (unsaturated) hydrocarbons of the unsaturated hydrocarbon-containing gas to react directly with oxygen to produce $CO_2$ and $H_2O$, achieves the goal of deoxidating a hydrocarbon-containing tail gas, and can suppress the generation of carbon deposits on the catalyst surface and the production of by-product CO, and exhibits a strong tolerance to the fluctuations of the oxygen content of the feed gas.

DESCRIPTION OF REFERENCE SIGNS

Figure 1:
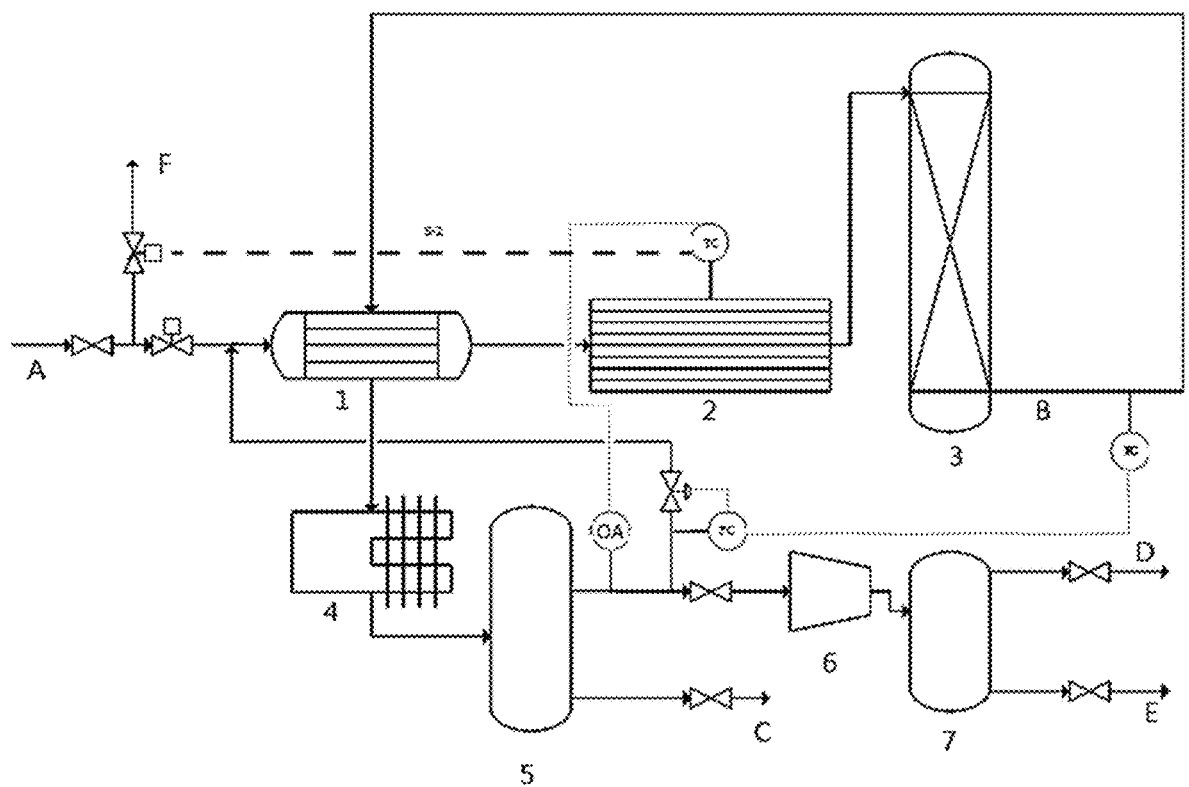
FIG. 1 illustrates a flow diagram of an unsaturated hydrocarbon-containing gas catalytic oxidation-deoxidation process according to a specific embodiment of the present disclosure.

1. Heat exchange unit
2. Heating unit
3. Deoxygenation reaction unit
4. Temperature reduction unit
5. Gas-liquid separation unit
6. Compressor
7. Non-condensable gas separating column
A. Unsaturated hydrocarbon-containing gas
B. Deoxygenated gas
C. Waste fluid
D. Non-condensable gas
E. Unsaturated hydrocarbons
F. Combustible gas emission system
OA. Tail oxygen analysis unit

DETAILED DESCRIPTION

Unless otherwise specified in the present disclosure, the concentration "%" of gas refers to "% by volume", the term "space velocity" refers to "hourly volume space velocity", and the pressure refers to an absolute pressure.

According to a first aspect of the present disclosure, provided a catalyst comprising a carrier as well as an active component, a first co-agent component and a second co-agent component loaded on the carrier, the active component is one or more selected from the group consisting of oxides of Pt, Pd, Ru, Rh, Ag and Ir;

along a radial direction from a core of the carrier to the outer surface of the carrier, the content of said active component is gradually increased and then gradually decreased to form a peak shape distribution, the content of said first co-agent component is gradually increased and then gradually decreased to form a peak shape distribution, the content of said second co-agent component is gradually increased, and the peak value of the content of said active component is 0.2 wt % or more;

the first co-agent component comprises one or more selected from the group consisting of a rare earth metal element, a group IVB metal element and a group VIII metal element; and the second co-agent component comprises one or more selected from the group consisting of an alkali metal element and an alkaline earth metal element; the active component is contained in an amount of 0.05-2 wt % in terms of the metallic element, the first co-agent component is contained in an amount of 0.1-3 wt % in terms of the oxide, and the second co-agent component is contained in an amount of 1-7 wt % in terms of the oxide, based on the dry weight of the catalyst.

According to the present disclosure, preferably, the carbon deposits percentage content by mass y of the catalyst measured in a propylene atmosphere at a pressure of 0.6 MPa and a temperature of 573.15K has the following characteristics:

$$y=0.9y1-1.1y1, y1=(-0.0029+0.3748 \times t^{0.3013})/100$$

t: reaction time, within a range of 100-2,000 h;

wherein the catalyst has a carbon deposits percentage content by mass being 0.2% or less before measurement.

According to the present disclosure, when the catalyst has a carbon deposits percentage content by mass being 0.2% or less before measurement, the catalyst can be treated with a commonly used method of regenerating the catalyst in the art such that the carbon deposits percentage content by mass of the catalyst meets the requirement of the present disclosure before testing; and as a regeneration method, the catalyst can be calcined, for example.

In the present disclosure, "dry weight of catalyst" refers to the weight of a catalyst dried to a constant weight at 200° C.

According to the present disclosure, preferably, the saturated oxygen adsorption amount q of the catalyst after hydrogen reduction under a normal pressure and a temperature of 473.15K has the following characteristics:

$$q=0.8q1-1.2q1, q1=a+b \times T^c+d \times T^e$$

q: saturated adsorption amount of oxygen, mL/g;
T: adsorption temperature, within a range of 323.15-623.15K;
$a=-0.0685$; $b=7.016 \times 10^{-6}$; $c=2.06$; $d=-5.83 \times 10^{-8}$; $e=2.76$.

According to the present disclosure, the catalyst comprises a carrier as well as an active component, a first co-agent component and a second co-agent component loaded on the carrier, the active component is one or more noble metal elements selected from the group consisting of oxides of Pt, Pd, Ru, Rh, Ag and Ir; the first co-agent component comprises one or more selected from the group consisting of a rare earth metal element, a group IVB metal element and a group VIII metal element; and the second co-agent component comprises one or more selected from the group consisting of an alkali metal element and an alkaline earth metal element; preferably, the first co-agent component comprises one or more selected from the group consisting of a group IVB metal element and a group VIII metal element, and the second co-agent component comprises an alkali metal element; further preferably, the first co-agent component is one or more selected from the group consisting of ferric oxide, cobalt oxide, nickel oxide and titanium oxide, and the second co-agent component is sodium oxide; further more preferably, the weight ratio of the first co-agent component to the second co-agent component is 1:20-220, preferably 1:60-200.

Preferably, the active component is contained in an amount of 0.1-1 wt % in terms of the metallic element, the first co-agent component is contained in an amount of 0.1-1 wt % in terms of the oxide, and the second co-agent component is contained in an amount of 3-8 wt % in terms of the oxide, based on the dry weight of the catalyst; more preferably, the active component is contained in an amount of 0.2-0.5 wt % in terms of the metallic element, the first co-agent component is contained in an amount of 0.1-0.7 wt % in terms of the oxide, and the second co-agent component is contained in an amount of 4-6 wt % in terms of the oxide, based on the dry weight of the catalyst.

Preferably, along a radial direction from a core of the carrier to the outer surface of the carrier, the content of the active component is gradually increased and then gradually decreased to form a peak shape distribution, the content of the first co-agent component is gradually increased and then gradually decreased to form a peak shape distribution, the content of the second co-agent component is gradually increased, and the peak value of the content of the active component is with a range of 0.2-0.4 wt %; more preferably, along a radial direction from a core of the carrier to the outer surface of the carrier, the content of the active component is gradually increased and then gradually decreased to form a peak shape distribution, the content of the first co-agent component is gradually increased and then gradually decreased to form a peak shape distribution, the content of the second co-agent component is gradually increased, and the peak value of the content of the active component is within a range of 0.2-0.35 wt %; further preferably, along a radial direction from a core of the carrier to the outer surface of the carrier, the content of the active component is gradually increased and then gradually decreased to form a peak shape distribution, the content of the first co-agent component is gradually increased and then gradually decreased to form a peak shape distribution, the content of the second co-agent component is gradually increased, and the peak value of the content of the active component is within a range of 0.2-0.3 wt %.

In the present disclosure, the carrier may be various substance(s) which can be used as catalyst carrier(s), preferably, in order to further reduce carbon deposits, the carrier is one or more selected from the group consisting of alumina, silica, titania, molecular sieves and carbon nanotubes, further preferably alumina, silica and the like.

Preferably, in order to further reduce the carbon deposits, the catalyst has a specific surface area of 100-260 $m^2/g$, more preferably 120-220 $m^2/g$; and a pore volume of 0.2-0.7 $cm^3/g$, more preferably 0.3-0.6 $cm^3/g$; the mesopores with a pore size more than 2 nm and 50 nm or less constitute 2-40%, further preferably 5-30% of the total pore volume, and the macropores with a pore size more than 50 nm and 200 nm or less constitute 50-90%, further preferably 60-80% of the total pore volume. Unless otherwise indicated in the present disclosure, the specific surface area and pore volume are measured by using BET method, and the pore distribution is determined by using BJH method.

Preferably, for the sake of further reducing carbon deposits, the active component having a dispersion size less than 10 nm is contained in an amount of 80 wt % or more of the total amount of active component; more preferably, the active component having a dispersion size less than 10 nm is contained in an amount of 85 wt % or more, further preferably 90 wt % or more, further more preferably 95 wt % or more of the total amount of active component; wherein the active size and the corresponding content are measured by the STEM scanning analysis.

As the preparation method of the catalyst of the present disclosure, impregnation method is preferably used, such as saturation impregnation, equivalent-volume impregnation. The sequence of impregnating the active component and the co-agent components is not particularly limited, the components can be simultaneous impregnated and loaded, or separately impregnated and loaded; in particular, a solution containing the active component and the co-agent components may contact with the carrier, followed by the drying and calcining process; or a solution containing the active component or the co-agent component may contact with a carrier, followed by the drying and calcining process, subsequently contacting a solution containing the co-agent component or the active component with the carrier, followed by the drying and calcining process, thereby producing a catalyst loaded with the active component and the co-agent components. Preferably, the drying temperature may be within a range of 80-150° C. and the time may be 10-100 min; the calcination temperature may be within a range of 500-600° C. and the time may be 30-300 min.

In a preferred embodiment of the present disclosure, the catalyst is prepared according to the following steps.

1) Subjecting an aqueous solution containing the active ingredient to a first equivalent-volume impregnation with an alumina carrier at the condition of a pH of 3-4, then performing a first drying process;
2) Subjecting an aqueous solution containing the first co-agent component to a second equivalent-volume impregnation with the alumina obtained in step 1) in the presence of an organic complexing agent at a pH of 8-10, subsequently performing a second drying process;
3) Subjecting the aqueous solution containing the second co-agent component to a third equivalent-volume impregnation with the alumina carrier obtained in step 2) at a pH of 9-11, then performing a third drying and calcining process.

Preferably, said first drying process is performed at a temperature of 70-90° C. for 100-200 min.

Preferably, said second drying process is performed at a temperature of 110-150° C. for 50-150 min.

Preferably, said third drying process is performed at a temperature of 160-190° C. for 50-150 min.

Preferably, the calcination temperature is within a range of 450-550° C. and the calcination time is 2-10 hours.

The amounts of each component in each of the above steps are not specifically restricted, only if the contents of components in the prepared catalyst fall within the scopes of the present disclosure.

The organic complexing agent may be, for example, one or more selected from the group consisting of ethanolamine, diethanolamine and triethanolamine.

The amount of the organic complexing agent is not particularly limited, and may be, for example, 1-3 mass % of the impregnating solution.

According to a second aspect of the present disclosure, provided a catalytic oxidation-deoxidation method for an unsaturated hydrocarbon-containing gas comprising an unsaturated hydrocarbon and oxygen, the method comprises contacting the unsaturated hydrocarbon-containing gas with a catalyst and performing a catalytic oxidation process to remove oxygen from the unsaturated hydrocarbon-containing gas; wherein the catalyst is said catalyst of the present disclosure, the contacting conditions comprise that the unsaturated hydrocarbon-containing gas has a hourly volumetric space velocity of 200-50,000 $h^{-1}$, a pressure of 0.01-20 MPa, a linear velocity of 0.02-10 m/s, and a product of the pressure and the linear velocity being within a range of 0.1-5 MPa·m/s.

Preferably, the contacting conditions comprise that the unsaturated hydrocarbon-containing gas has a hourly volumetric space velocity of 200-20,000 $h^{-1}$, a pressure of 0.1-20 MPa, a linear velocity of 0.02-10 m/s, and a product of the pressure and the linear velocity being within a range of 0.1-5 MPa·m/s.

More preferably, the unsaturated hydrocarbon-containing gas has a hourly volumetric space velocity of 500-20,000 $h^{-1}$, a pressure of 0.4-10 MPa, a linear velocity of 0.02-5 m/s, and a product of the pressure and the linear velocity being within a range of 0.2-5 MPa·m/s.

Further preferably, the unsaturated hydrocarbon-containing gas has a hourly volumetric space velocity of 500-10,000 $h^{-1}$, a pressure of 0.4-10 MPa, a linear velocity of 0.02-5 m/s, and a product of the pressure and the linear velocity being within a range of 0.2-5 MPa·m/s.

Further more preferably, the unsaturated hydrocarbon-containing gas has a hourly volumetric space velocity of 500-10,000 $h^{-1}$, a pressure of 0.4-10 MPa, a linear velocity of 0.02-5 m/s, and a product of the pressure and the linear velocity being within a range of 0.2-2 MPa·m/s.

In the present disclosure, linear velocity of an unsaturated hydrocarbon-containing gas refers to the flow rate of the gas in m/s, and is obtained by a method of dividing a flow rate ($m^3/s$) by the cross-sectional area ($m^2$).

According to the present disclosure, the unsaturated hydrocarbons are unsaturated hydrocarbons of C4 or fewer carbon atoms, preferably one or more selected from the group consisting of ethylene, propylene, 1-butene, 2-butene, isobutylene, 1,3-butadiene, acetylene, propyne, 1-butyne and 2-butyne.

In the present disclosure, the unsaturated hydrocarbon-containing gas may contain an unsaturated hydrocarbon and oxygen, preferably in terms of the volume percent concentration, the unsaturated hydrocarbon-containing gas comprises 0.2-8% of oxygen and 5-99% of unsaturated hydrocarbon; more preferably, the unsaturated hydrocarbon-containing gas comprises 0.5-5% of oxygen, 20-95% of unsaturated hydrocarbon, and the balance being saturated hydrocarbons or other inert gases which do not significantly adversely affect the catalytic oxidation reaction, such as nitrogen gas, carbon dioxide, hydrogen gas and other organic gases. After the catalytic deoxidation treatment of the present disclosure, the gas phase obtained from the gas-liquid separation comprises oxygen gas in a volume percent concentration less than 0.2%, a CO selectivity less than 0.5%, and a $CO_2$ selectivity larger than 98%. The method of the present disclosure is particularly suited for treating the propylene tail gas of an epoxypropane device, such as the propylene tail gas from chlorhydrin method epoxypropane device and/or epoxypropane manufacturing device with hydrogen peroxide process.

According to the present disclosure, the catalyst allows the oxidation reaction of the unsaturated hydrocarbon in the unsaturated hydrocarbon-containing gas with oxygen gas to achieve the purpose of removing oxygen. Preferably, the unsaturated hydrocarbon is fully oxidized with the reaction formula: $C_xH_y+O_2 \rightarrow CO_2+H_2O$, wherein $C_xH_y$ represents unsaturated hydrocarbon.

By using the catalyst of the present disclosure, most of the oxygen gas can carry out a complete oxidation reaction with unsaturated hydrocarbons, thereby producing desirable effects of deoxygenation and preventing carbon deposits.

As the conditions of the catalytic oxidation-deoxidation method of the present disclosure, it is preferable that the reactor inlet temperature is within a range of 60-400° C., the reactor outlet temperature is within a range of 100-600° C.; more preferably, the reactor inlet temperature is within a range of 100-380° C., the reactor outlet temperature is within a range of 150-550° C. Wherein the reactor outlet temperature is generally 50-270° C., preferably 80-200° C. higher than the reactor inlet temperature. By carrying out the catalytic oxidation-deoxidation reaction under the aforementioned conditions, the deoxygenation efficiency can be further improved. Preferably, the catalytic oxidation reaction is carried out in a fixed-bed reactor, more preferably in a fixed-bed adiabatic reactor. According to the present disclosure, preferably, the method further comprises the following steps:

(1) Subjecting the gas obtained from catalytic oxidation reaction to a temperature reduction and a gas-liquid separation;

(2) Separating the gas phase obtained from the gas-liquid separation to produce at least a portion of the unsaturated hydrocarbons.

By subjecting the gases obtained from the catalytic oxidation reaction to the above-mentioned operations, pure unsaturated hydrocarbons can be recovered.

According to the present disclosure, in order to fully utilize the heat generated by the catalytic oxidation reaction, preferably, the method further comprises prior to the catalytic oxidation, performing heat exchange between the unsaturated hydrocarbon-containing gas and the gas obtained from the catalytic oxidation reaction. In addition, for the sake of ensuring gas-liquid separation effect, it is more preferable to cool the gas obtained from the catalytic oxidation reaction to a temperature below 40° C. (e.g., 20-30° C.), and then perform the gas-liquid separation.

According to another embodiment of the present disclosure, the catalytic oxidation-deoxidation method for an unsaturated hydrocarbon-containing gas provided by the present disclosure further comprises a safety control step, the safety control step comprises an interlock-start alarm step, wherein the interlock-start alarm step comprises determining whether the reactor inlet temperature, the reactor outlet temperature, the feed gas oxygen content, the tail gas oxygen content reach the corresponding alarm value or interlock value, and performing the following alarm interlock control:

The interlock-start alarm step comprise: (1) setting a low alarm value of the reactor inlet temperature, turning up the power of the heating unit 2 after the alarm; setting a low interlock value of the reactor inlet temperature, closing the inlet shut-off valve and discharging the gas to a torch after the interlock-start; (2) setting a high alarm value of the reactor outlet temperature, turning down the power of the heating unit 2 and increasing circulation volume of the gas after the alarm; setting a high interlock value of the reactor outlet temperature, cutting off the reaction feed, increasing the refrigeration capacity of the reactor cooling system, filling the reactor with nitrogen gas to dilute and cool the gas after the interlock-start; (3) setting a high alarm value of the oxygen content of the feed gas, adjusting circulation volume of the gas after the alarm; setting a high interlock value of the oxygen content of the feed gas, filling the reactor with nitrogen gas to dilute the oxygen content to a safe area and subsequently performing deoxygenation reaction after the interlock-start; and (4) setting a high alarm value of the oxygen content of the tail gas after the deoxygenation process, adjusting the reactor inlet temperature after the alarm.

Preferably, the low alarm value of the reactor inlet temperature is 60-90° C., the low interlock value of the reactor inlet temperature is 40-60° C., the high alarm value of the reactor outlet temperature is 580-610° C., the high interlock value of the reactor outlet temperature is 610-650° C., the high alarm value of the feed gas oxygen content is 7.5-8.5% by volume, the high interlock value of the feed gas oxygen content is 8.5-10% by volume, and the high alarm value of the tail gas oxygen content is 0.2-0.3% by volume. Specifically, the low alarm value of the reactor inlet temperature may be 80° C., the low interlock value of the reactor inlet temperature may be 50° C., the high alarm value of the reactor outlet temperature may be 600° C., the high interlock value of the reactor outlet temperature may be 630° C., the high alarm value of the feed gas oxygen content may be 8% by volume, the high interlock value of the feed gas oxygen content may be 9% by volume, and the high alarm value of the tail gas oxygen content may be 0.25% by volume.

The present disclosure further provides a catalytic oxidation-deoxidation apparatus for an unsaturated hydrocarbon-containing gas, the apparatus comprising a heat exchange unit, a heating unit, a deoxygenation reaction unit, a temperature reduction unit, a gas-liquid separation unit and a hydrocarbon separation unit; wherein the heat exchange unit is used for perform heat exchange between the unsaturated hydrocarbon-containing gas with the gas treated by the deoxygenation reaction unit, so as to warm up the unsaturated hydrocarbon-containing gas while cooling down the gas treated by the deoxygenation reaction unit; the heating unit serves to further heat the unsaturated hydrocarbon-containing gas which has been undergone heat exchange in the heat exchange unit; the deoxygenation reaction unit is used for catalytically oxidizing the unsaturated hydrocarbon-containing gas derived from the heating unit, in order to remove oxygen from the unsaturated hydrocarbon-containing gas; the temperature reduction unit is connected with the heat exchange unit for further cooling down the gas treated by the deoxygenation reaction unit; and the gas-liquid separation unit serves to separate the gas and liquid phases that have been cooled by the temperature reduction unit;

the hydrocarbon separation unit is used for separating at least part of propylene from the gas-phase that is obtained from the gas-liquid separation unit.

In a preferred embodiment of the present disclosure, the catalytic oxidation-deoxidation apparatus is shown in FIG. 1, the apparatus comprises a heat exchange unit 1, a heating unit 2, a deoxygenation reaction unit 3, a temperature reduction unit 4, a gas-liquid separation unit 5 and a hydrocarbon separation unit; wherein the heat exchange unit 1 is used for performing heat exchange between the unsaturated hydrocarbon-containing gas A with a gas treated by the deoxygenation reaction unit 3 (also referred to as "deoxygenated gas B"), so as to warm up unsaturated hydrocarbon-containing gas A while cooling down the deoxygenated gas B; the heating unit 2 is used for further heating the unsaturated hydrocarbon-containing gas that has been undergone heat exchange in the heat exchange unit 1; the deoxygenation reaction unit 3 is used for catalytically oxidizing the unsaturated hydrocarbon-containing gas derived from the heating unit 2, in order to remove oxygen from the unsaturated hydrocarbon-containing gas; the temperature reduction unit 4 is connected with the heat exchange unit 1 for further cooling down the deoxygenated gas B that has been undergone heat exchange in the heat exchange unit 1; the gas-liquid separation unit 5 serves to separate a liquid phase from a gas phase that is cooled by the temperature reduction unit 4; and the hydrocarbon separation unit is used for separating at least part of the hydrocarbons from the gas phase that is obtained from the gas-liquid separation unit.

In the present disclosure, the liquid phase separated from the gas-liquid separation unit 5 is regarded as waste fluid C, the obtained gas phase is used for separating hydrocarbons, and it is subjected to separation by the hydrocarbon separation unit to produce unsaturated hydrocarbons E and non-condensable gas D.

According to the present disclosure, the heat exchange unit 1 is connected with a heating unit 2 for exchanging heat between unsaturated hydrocarbon-containing gas A and deoxygenated gas B introduced into the heat exchange unit 1, the heat exchange warms up the unsaturated hydrocarbon-containing gas to expedite catalytic oxidation while cooling down deoxygenated gas B to facilitate the gas-liquid separation.

The present disclosure does not impose a particular limitation on the heat exchange unit 1, as long as the heat exchange effect can be achieved, the heat exchange unit 1 may be an available heat exchanger that can be used for heat exchange of gas. For example, a jacket type heat exchanger, a plate type heat exchanger, a shell and tube type heat exchanger may be used.

The present disclosure does not impose a particular limitation on the heating unit 2, only if it is capable of heating unsaturated hydrocarbon-containing gas A to a desired temperature, it may be an available heater that serves to heat the gas, such as an electric heater, a solar heater. The heating unit 2 may be turned on or off as needed, and the heating unit 2 may not be turned on if, upon reaching a steady state, the heat generated by the reaction in the deoxygenation reaction unit 3 may allow the gas, after having been heat exchanged by the heat exchange unit 1, to reach the temperature required by the reaction.

According to the present disclosure, the deoxygenation reaction unit 3 is used for the catalytic oxidation of unsaturated hydrocarbon-containing gas in order to remove oxygen from the unsaturated hydrocarbon-containing gas to obtain deoxygenated gas B. The deoxygenation reaction unit 3 may be an available deoxygenation reactor that can be used for the catalytic oxidation of the hydrocarbon gas, preferably a fixed-bed adiabatic reactor.

According to the present disclosure, the deoxygenation reaction unit 3, the heat exchange unit 1 and the temperature reduction unit 4 are connected in sequence, such that the heat exchange unit 1 is capable of exchanging heat of deoxygenated gas B with unsaturated hydrocarbon-containing gas A, cooling deoxygenated gas B to facilitate the next step of gas-liquid separation, and sufficiently utilizing the heat from deoxygenated gas B to preheat unsaturated hydrocarbon-containing gas A to expedite the catalytic deoxygenation reaction.

The temperature reduction unit 4 is not particularly limited in the present disclosure, only if it can further cool down deoxygenated gas B to the desired temperature; it may be an available condenser or heat exchanger which can be used for cooling the gas, for example, an air condenser.

The gas-liquid separation unit 5 is not particularly defined in the present disclosure, only if it can perform separation of gas phase and liquid phase obtained by cooling in the temperature reduction unit 4, it may be an available gas-liquid separation tank. The gas-liquid separation unit 5 may particularly carry out a baffling separation, a centrifugal separation, a packing separation, a screen separation, a microporous filter separation and the like.

The present disclosure does not impose a specific limitation to the hydrocarbon separation unit, only if it can separate at least part of the unsaturated hydrocarbons from the gas phase obtained from the gas-liquid separation unit, preferably separate the unsaturated hydrocarbons completely. The preferred hydrocarbon separation unit may comprise a compressor 6 and a non-condensable gas separating column 7, wherein the compressor 6 is used for compressing the gas phase obtained from the gas-liquid separation unit so that the unsaturated hydrocarbons therein are liquefied; the non-condensable gas separating column 7 is used for separating the unsaturated hydrocarbons in the compressed gas phase, in particular, separating the compressed liquid phase and the gas phase, thereby obtain liquid unsaturated hydrocarbons E and non-condensable gas D, respectively.

Preferably, in order to facilitate detection of the oxygen removal effect, the deoxygenation reaction apparatus of the present disclosure is further provided with a tail oxygen analysis unit (OA) for monitoring the oxygen content of the gas phase obtained from the gas-liquid separation unit 5. The tail oxygen analysis unit may be arranged in a pipeline connecting the gas-liquid separation unit 5 and the hydrocarbon separation unit. In addition, it is preferred that the apparatus of the present disclosure further comprises a feed gas analysis unit for monitoring the oxygen content of the gas introduced into the deoxygenation reaction unit 3, which may be provided in a main pipeline introducing the unsaturated hydrocarbon-containing gas.

In the present disclosure, the tail oxygen analysis unit and the feed gas analysis unit may be an analytical measuring devices capable of determining oxygen concentration in the prior art, such as a magnetic oxygen analyzer, an electrochemical oxygen spectrometer, a gas chromatography, a laser oxygen spectrometer, a zirconia oxygen spectrometer, a cobalt oxide oxygen spectrometers.

According to the present disclosure, in order to further reduce the oxygen content of the tail gas, at least part of the gas phase separated from the gas-liquid is preferably recycled when the oxygen content of the gas phase separated from the gas-liquid is high, and more preferably, the method further comprises recycling at least part of the gas phase separated from the gas-liquid with the unsaturated hydrocarbon-containing gas when the oxygen content of the tail gas in the gas phase separated from the gas-liquid separation is larger than or equal to 0.15%.

In order to accomplish the above-mentioned circulation, the deoxygenation reaction apparatus of the present disclosure is further provided with a circulation branch pipeline connecting the unsaturated hydrocarbon-containing gas ingress pipe, the circulation branch pipeline serves to return the gas phase obtained from the gas-liquid separation unit 5 to the unsaturated hydrocarbon-containing gas ingress pipe disposed upstream of the heat exchange unit 1. The circulation branch pipeline is preferably arranged in a pipeline connecting the gas-liquid separation unit 5 and the hydrocarbon separation unit, more preferably, arranged downstream of the tail oxygen analysis unit. The circulation branch pipeline is further preferably provided with a circulation regulating valve which serves to regulate the circulation volume of the gas phase obtained from the gas-liquid separation unit 5. In addition, the circulation branch pipeline may be provided with a booster (e.g., a Roots fan, a compressor, a draught fan) as needed. By circulating at least part of the gas phase obtained from the gas-liquid separation unit 5, it can be effectively guaranteed that the oxygen removal rate of the deoxygenation reaction apparatus reaches a desired value.

Preferably, the present disclosure further comprises an inlet temperature detector, an outlet temperature detector, a feed gas oxygen content detector and a tail gas oxygen content detector, which detect the feed gas oxygen content, the tail gas oxygen content, the reactor inlet temperature, the reactor outlet temperature, respectively.

According to the present disclosure, it is preferable that an inlet regulating valve is provided on an ingress pipe for introducing the unsaturated hydrocarbon-containing gas into the heat exchange unit 1, so as to regulate the introduction speed of the unsaturated hydrocarbon-containing gas; a discharge regulating valve for regulating the discharge amount of the unsaturated hydrocarbon-containing gas is provided on the inlet branch pipe; and a circulation regulating valve for regulating the circulation amount of gas obtained from gas-liquid separation unit 5 is provided on the circulation branch pipe. Further preferably, the method also comprises venting at least part of the unsaturated hydrocarbon-containing gas to a combustible gas emission system, and the venting of the unsaturated hydrocarbon-containing gas to the combustible gas emission system may be performed via an inlet branch pipeline. The inlet branch pipeline may be arranged on an ingress pipe that directs the unsaturated hydrocarbon-containing gas to the heat exchange unit 1.

The present disclosure will be described below with reference to examples, but the present disclosure is not limited thereto.

In the following examples, the scanning electron microscope (SEM) is a Hitachi S-4800 type cold field emission scanning electron microscope.

The active component content distribution is analyzed by regional sampling sites using a Hitachi S-4800 type cold field emission scanning electron microscope (provided with an X-ray Energy Disperse Spectroscopy (EDS) accessory), specifically:

the scanning electron microscope is used, the voltage is set at 5 kV, the cross section of the catalyst is selected, the enlargement factor is adjusted, the points are taken for every 0.2 mm along the radial direction of the catalyst in a clear field of view, the contents of an active component, a first co-agent component and a second co-agent component are measured for each point.

Catalyst pore structure analysis is determined by using an ASAP 2020 physisorption instrument manufactured by Micropericetics Instrument Corporation in theUSA, specific surface area is calculated and determined by using the BET method, and pore size distribution is calculated and determined by using BJH method.

Dispersion size of the catalyst and content of its corresponding active components are measured by STEM scanning analysis.

Preparation Examples 1-4

1) An aqueous solution containing active ingredient was subjected to a first equivalent-volume impregnation with alumina at a pH of 4, then subjected to drying at 80° C. for 150 min;
2) An aqueous solution containing a co-agent component 1 selected from the group consisting of rare earth metal oxides, group IVB metal oxides and group VIII metal oxides and ethanolamine (with an ethanolamine content of 2% by mass) was subjected to a second equivalent-volume impregnation with alumina obtained in step 1) at a pH of 9, then subjected to drying at 130° C. for 80 min;
3) An aqueous solution containing a co-agent component 2 selected from the group consisting of alkali metal oxides and alkaline earth metal oxides was subjected to a third equivalent-volume impregnation with alumina obtained in step 2) at a pH of 10, then subjected to drying at 170° C. for 100 min, and subsequently subjected to calcining at 500° C. for 3 hours to prepare catalytic oxidation catalysts A1-A4, the composition and structure of catalysts are shown below, the conditions of the steps are shown in Table 1.

Figure 2:
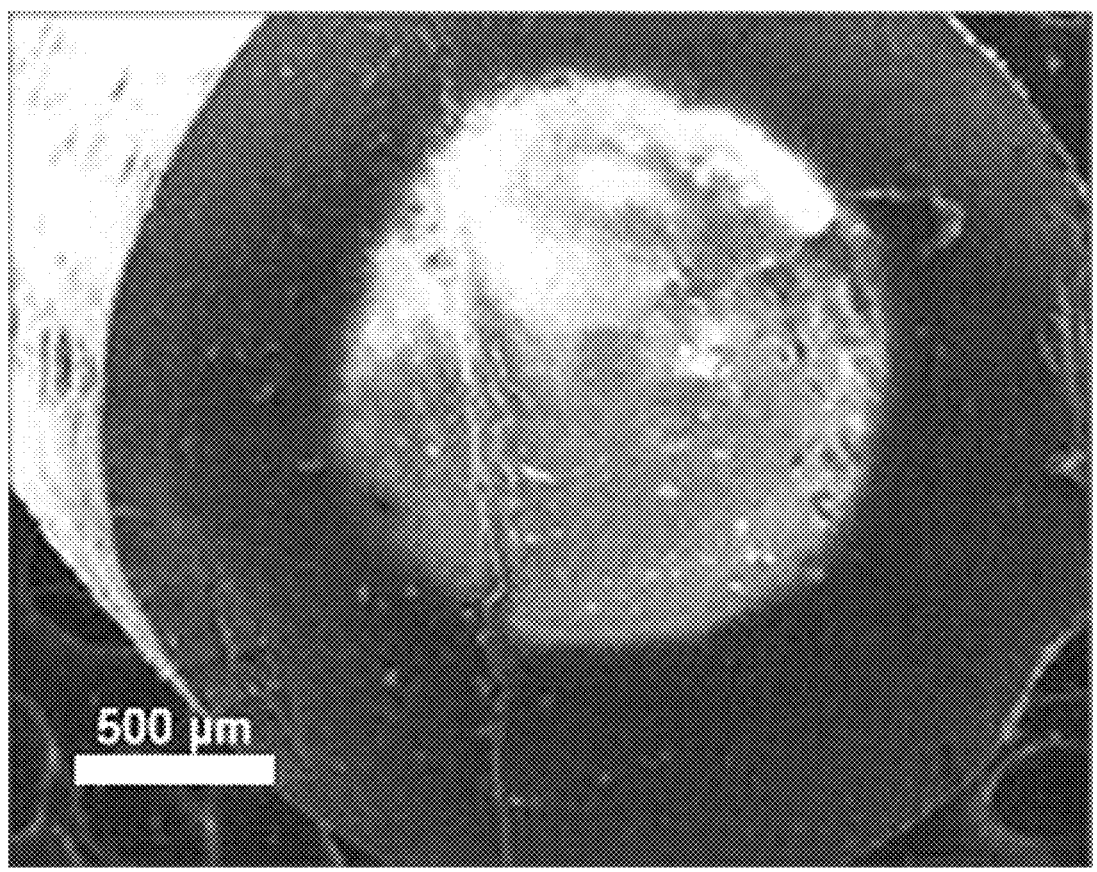
FIG. 2 illustrates a SEM image of the catalytic oxidation catalyst obtained in Preparation Example 1.
Figure 3:
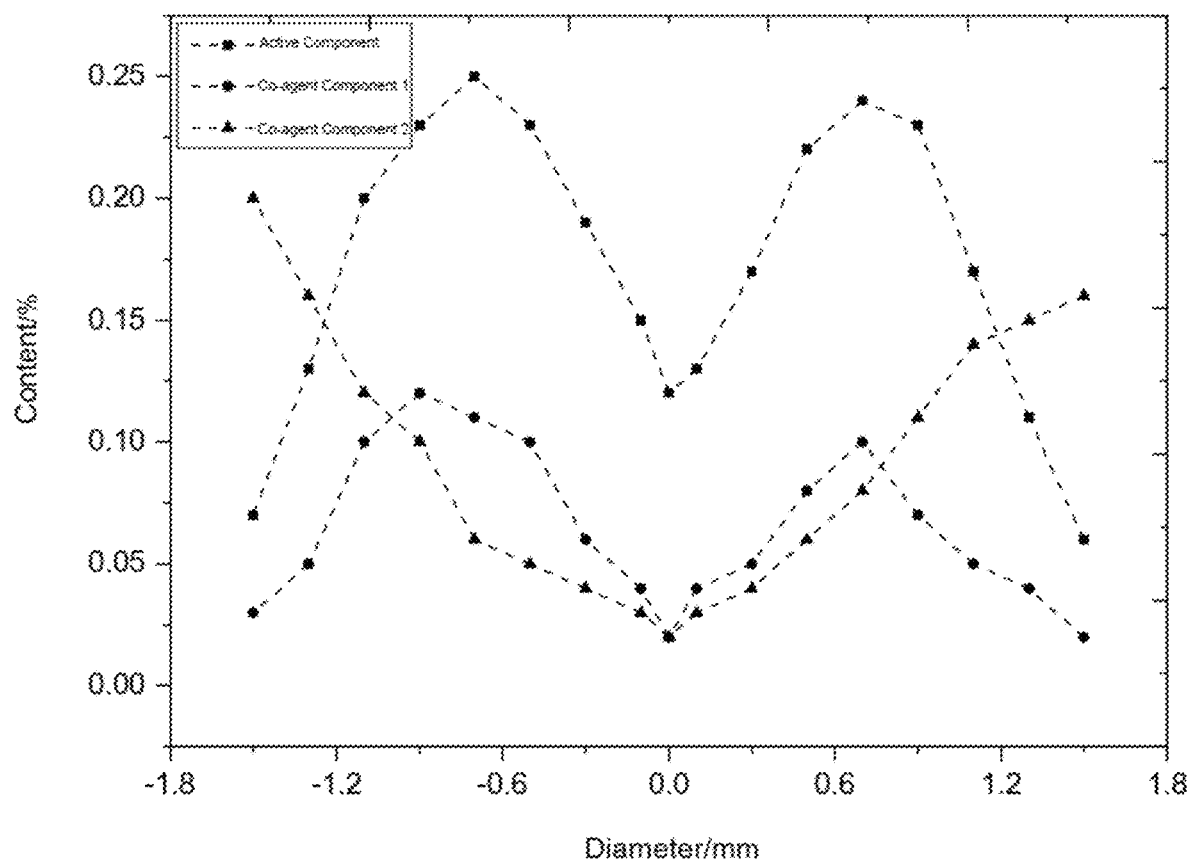
FIG. 3 illustrates a graph showing the content distribution of ingredients after impregnation in Preparation Example 1.
Figure 4:
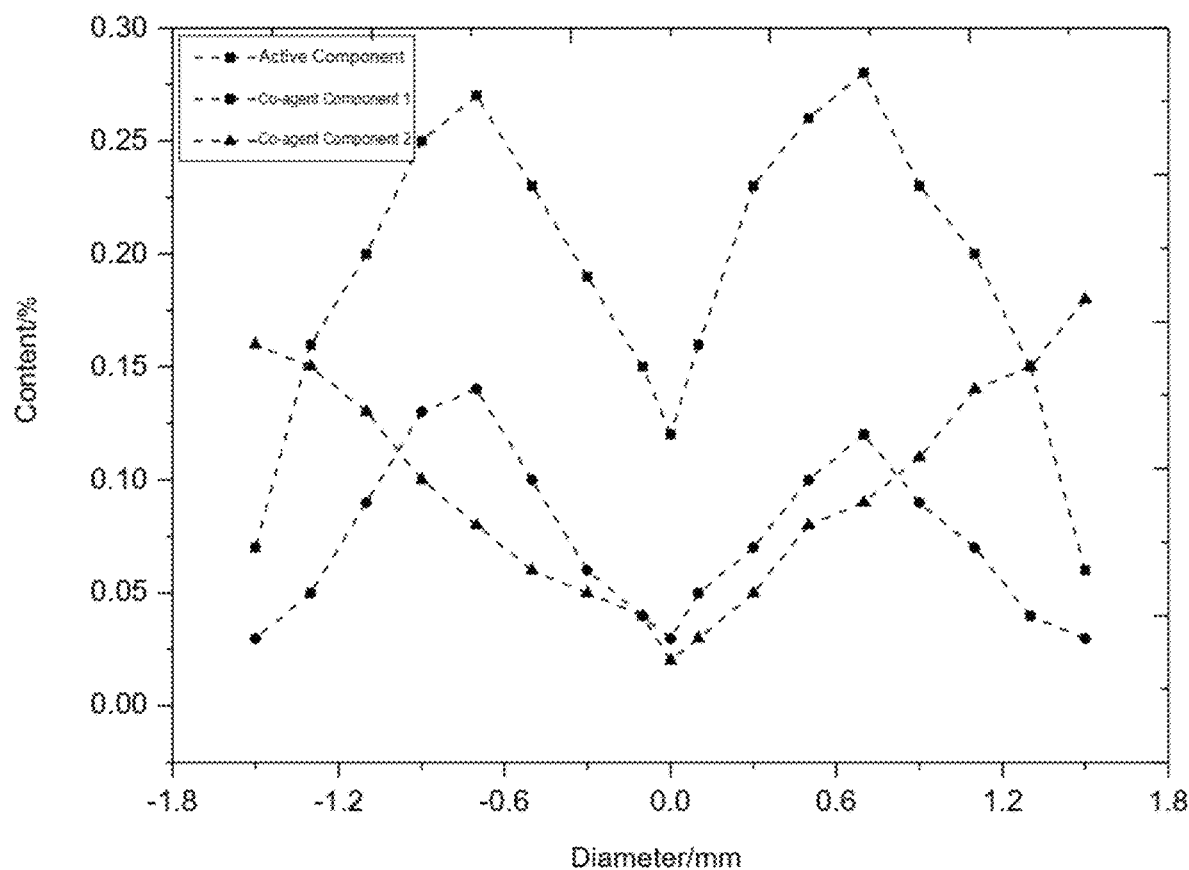
FIG. 4 illustrates a graph showing the content distribution of ingredients after impregnation in Preparation Example 2.
Figure 5:
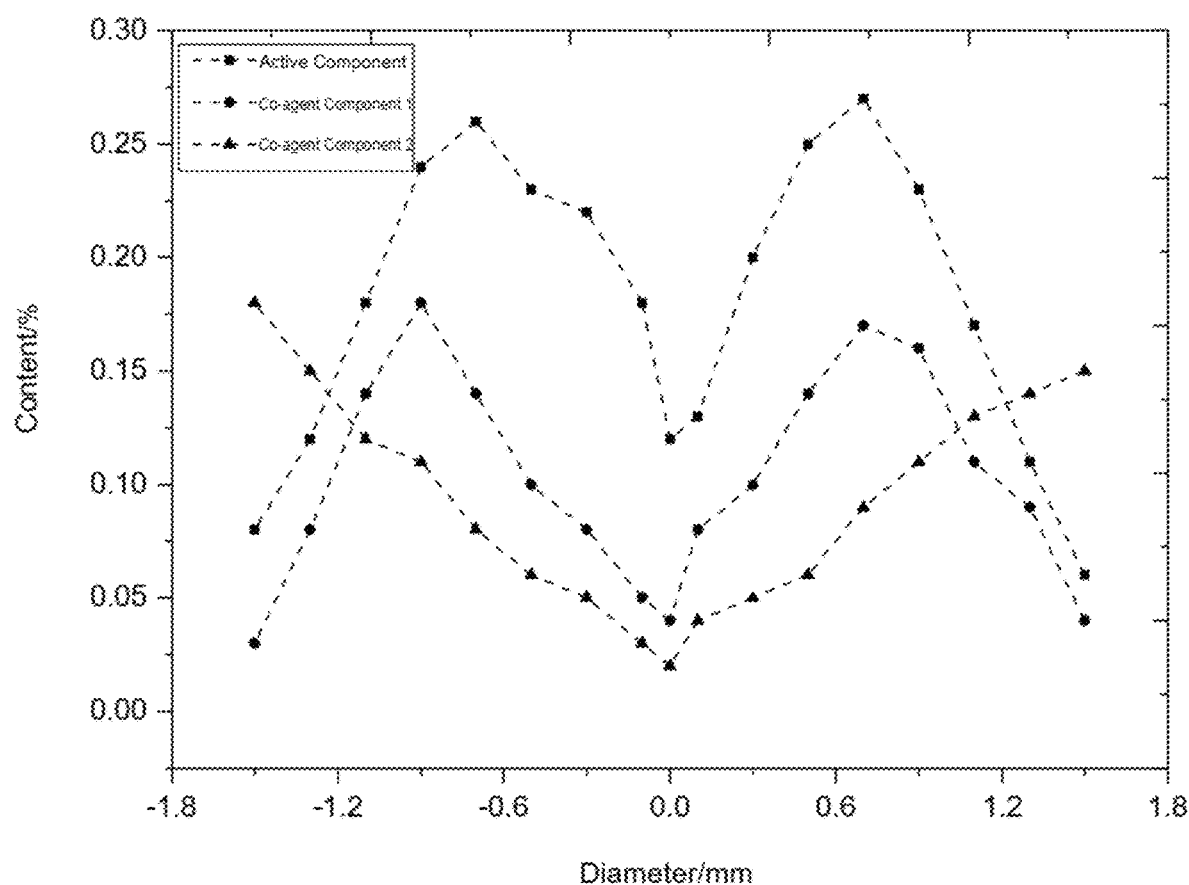
FIG. 5 illustrates a graph showing the content distribution of ingredients after impregnation in Preparation Example 3.
Figure 6:
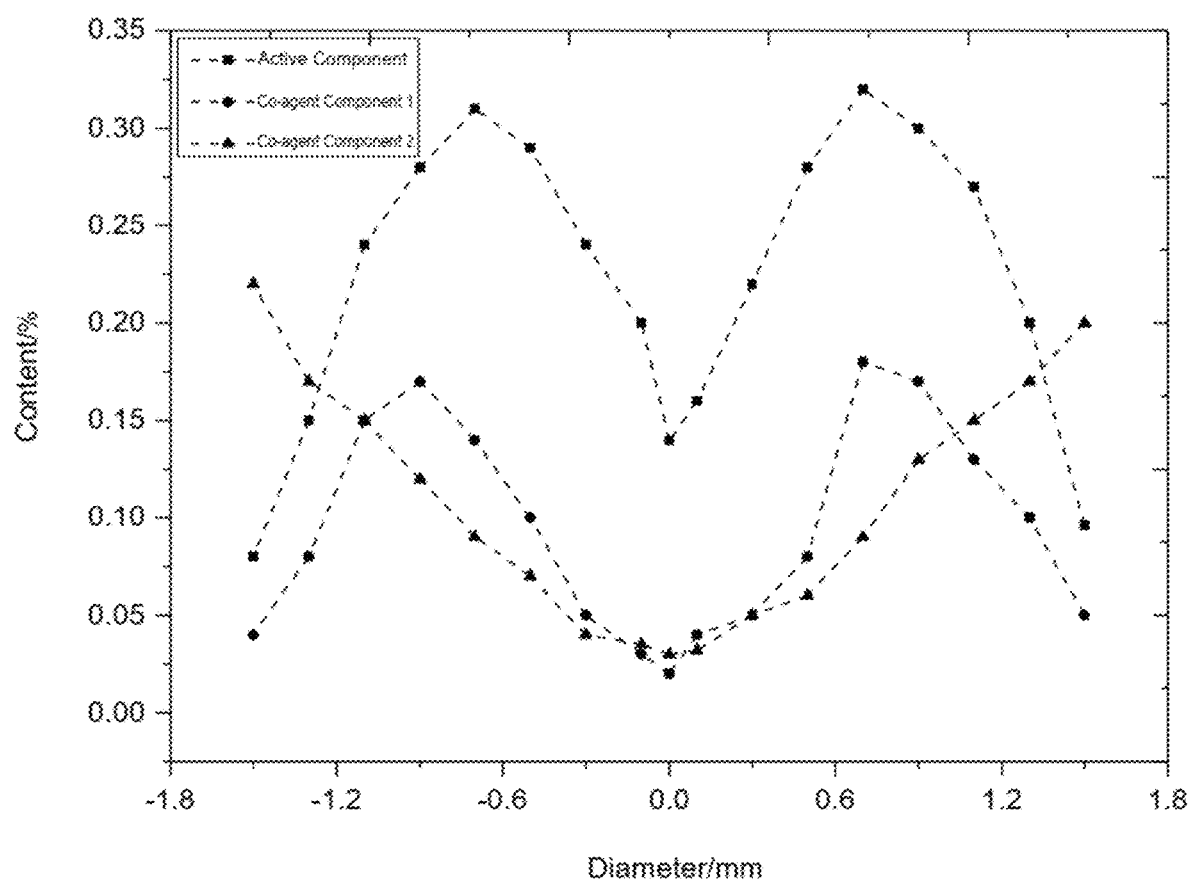
FIG. 6 illustrates a graph showing the content distribution of ingredients after impregnation in Preparation Example 4.

FIG. 2 illustrates a SEM image of the catalytic oxidation catalyst obtained in Preparation Example 1;

FIG. 3 illustrates a graph showing the content distribution of ingredients after impregnation in Preparation Example 1;

FIG. 4 illustrates a graph showing the content distribution of ingredients after impregnation in Preparation Example 2;

FIG. 5 illustrates a graph showing the content distribution of ingredients after impregnation in Preparation Example 3;

and FIG. 6 illustrates a graph showing the content distribution of ingredients after impregnation in Preparation Example 4. As shown in FIGS. 2-6, along a radial direction from a core of the carrier to the outer surface of the carrier, the content of the active component is gradually increased and then gradually decreased to form a peak shape distribution, the content of the co-agent component 1 is gradually increased and then gradually decreased to form a peak shape distribution, the content of the co-agent component 2 is gradually increased, and the peak value of the content of the active component is 0.2 wt % or more.

Comparison Preparation Example 1

The catalysts were prepared with the same method as Preparation Example 1, except that the impregnation of co-agent component 1 was not carried out, catalyst D1 was prepared, the composition and structure of catalysts were shown below.

Figure 7:
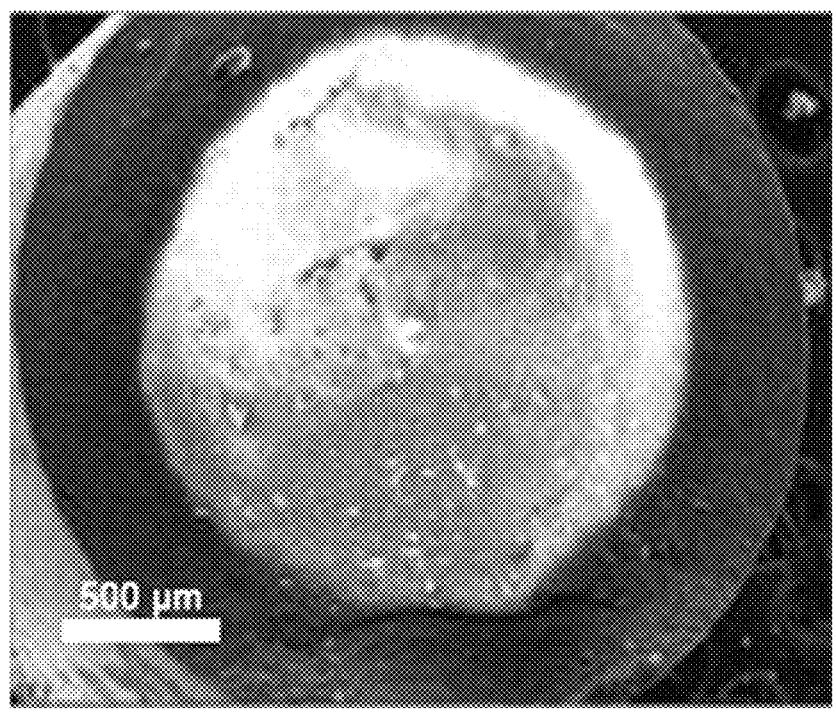
FIG. 7 illustrates a SEM image of the catalytic oxidation catalyst obtained in comparison Preparation Example 1.
Figure 8:
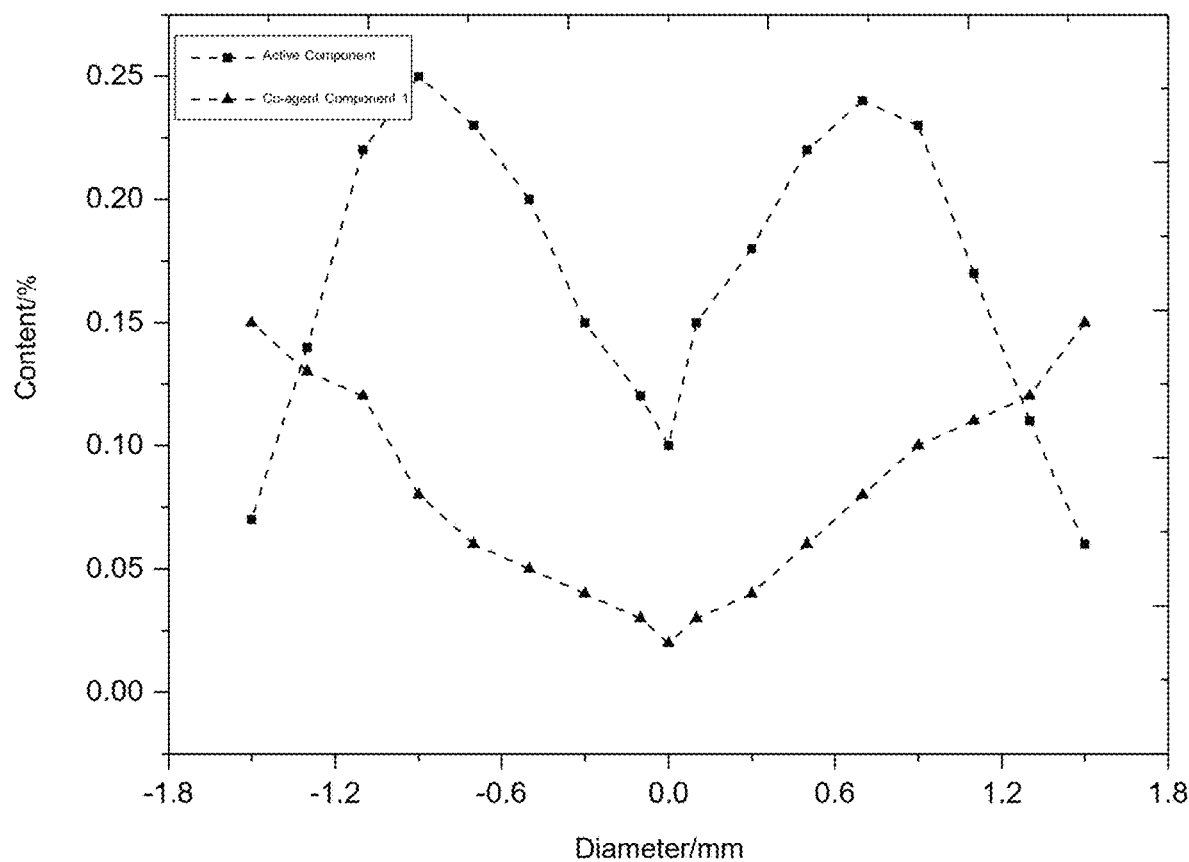
FIG. 8 illustrates a graph showing the content distribution of ingredients after impregnation in comparison Preparation Example 1.

FIG. 7 illustrates a SEM image of the catalytic oxidation catalyst obtained in Comparison Preparation Example 1; FIG. 8 illustrates a graph showing the content distribution of ingredients after impregnation in Comparison Preparation Example 1; as shown in FIGS. 7-8, along a radial direction from a core of the carrier to the outer surface of the carrier, the content of the active component is gradually increased and then gradually decreased to form a peak shape distribution, the content of the co-agent component 2 is gradually increased, and the peak value of the content of the active component is 0.2 wt % or more.

Comparative Preparation 2

The catalysts were prepared with the same method as Preparation Example 1, except that the impregnation of co-agent component 2 was not carried out, catalyst D2 was prepared, the composition and structure of catalysts were shown below.

Figure 9:
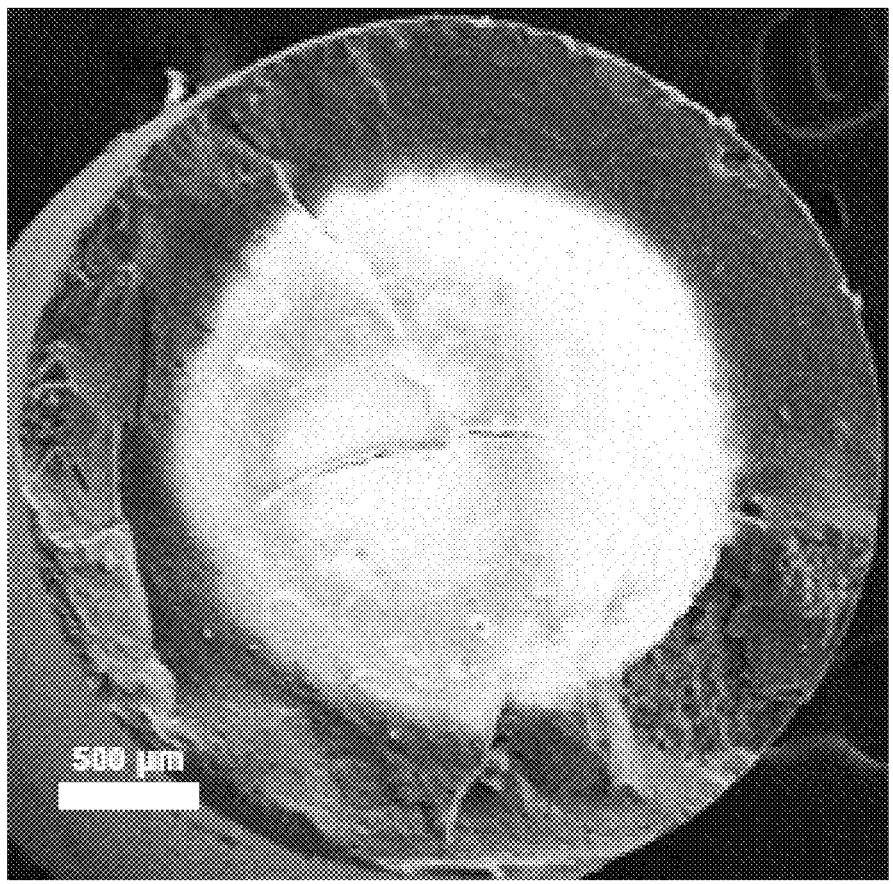
FIG. 9 illustrates a SEM image of the catalytic oxidation catalyst obtained in comparison Preparation Example 2.
Figure 10:
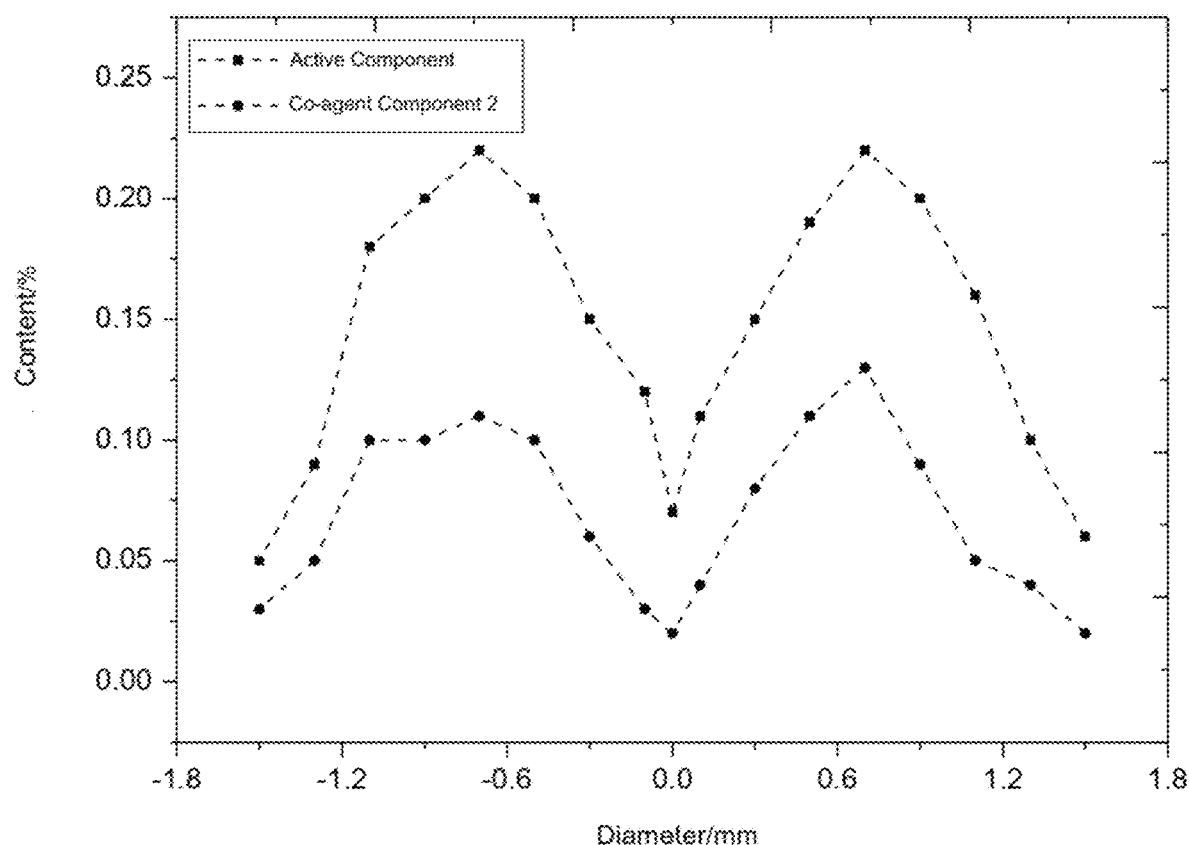
FIG. 10 illustrates a graph showing the content distribution of ingredients after impregnation in Comparison Preparation Example 2.

FIG. 9 illustrates a SEM image of the catalytic oxidation catalyst obtained in Comparison Preparation Example 2; FIG. 10 illustrates a graph showing the content distribution of ingredients after impregnation in Comparison Preparation Example 2; as shown in FIGS. 9-10, along a radial direction from a core of the carrier to the outer surface of the carrier, the content of the active component is gradually increased and then gradually decreased to form a peak shape distribution, the content of the co-agent component 1 is gradually increased and then gradually decreased to form a peak shape distribution, and the peak value of the content of the active component is 0.2 wt % or more.

Comparative Preparation 3

An aqueous solution containing active ingredient, co-agent component 1, co-agent component 2, and ethanolamine was subjected to an equivalent-volume impregnation with alumina at a pH of 4, then subjected to drying at 80° C. for 150 min, and subsequently subjected to calcining at 500° C. for 3 hours to prepare catalytic oxidation catalyst D3, the composition and structure of the catalyst were shown below.

Figure 11:
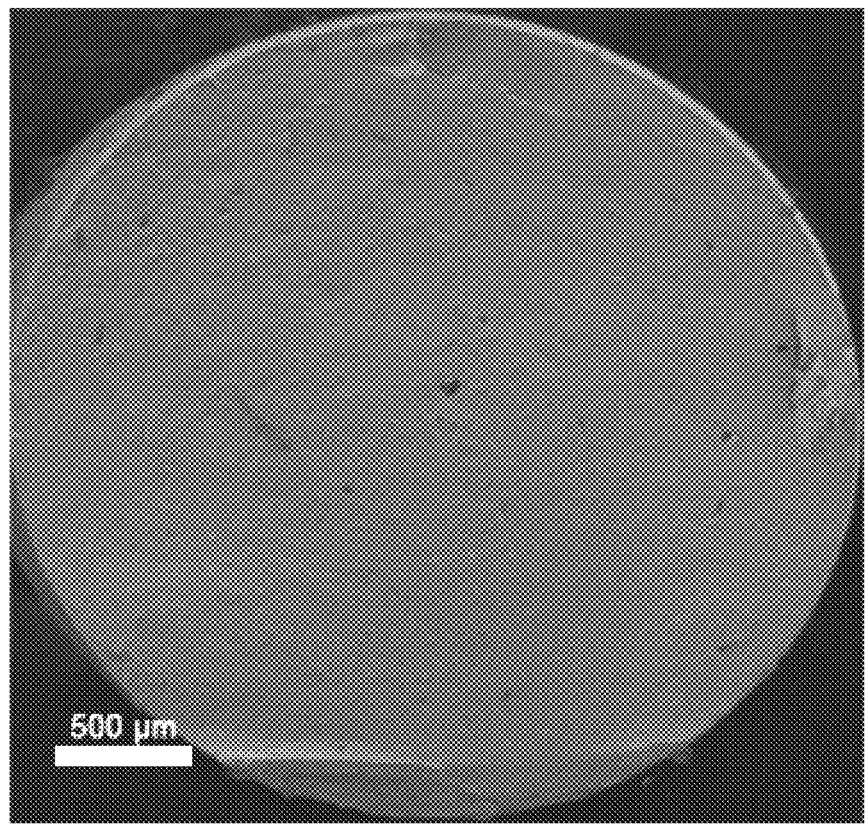
FIG. 11 illustrates a SEM image of the catalytic oxidation catalyst obtained in Comparison Preparation Example 3.
Figure 12:
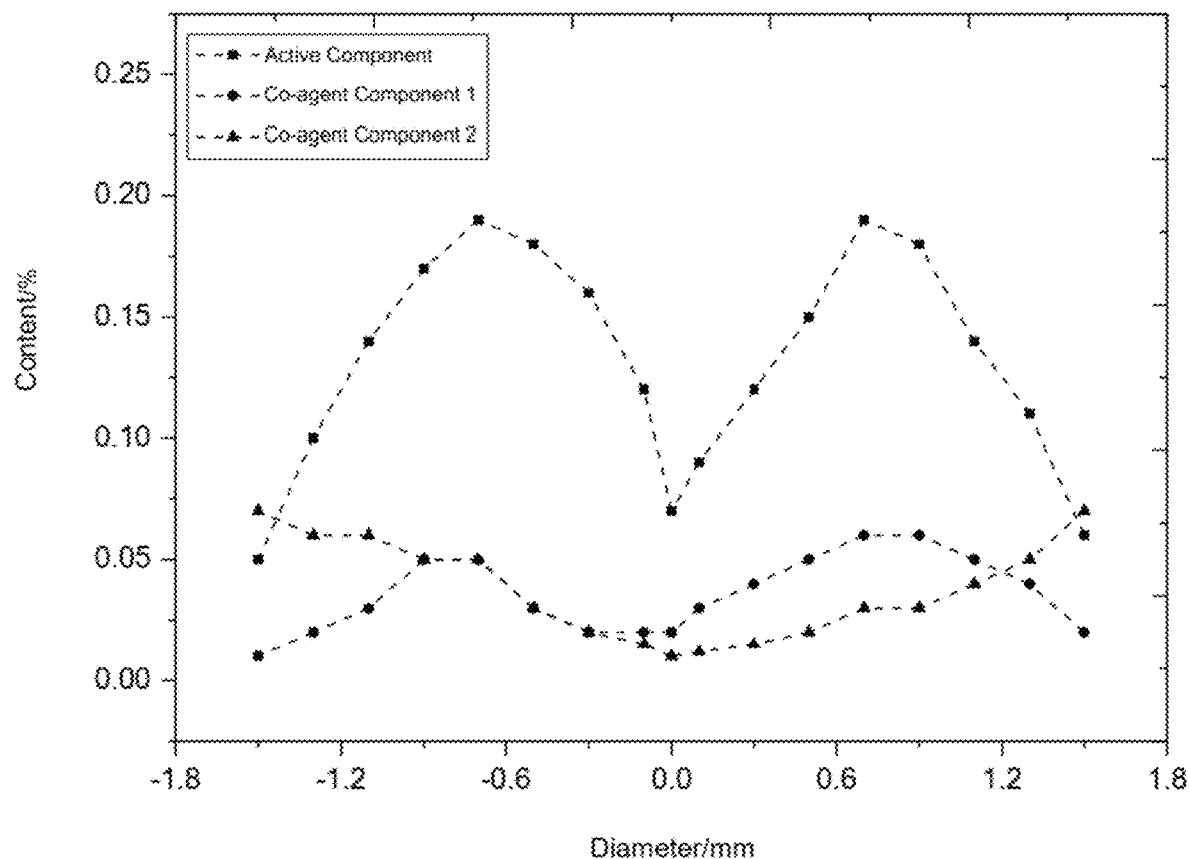
FIG. 12 illustrates a graph showing the content distribution of ingredients after impregnation in comparison Preparation Example 3.

FIG. 11 illustrates a SEM image of the catalytic oxidation catalyst obtained in Comparison Preparation Example 3; FIG. 12 illustrates a graph showing the content distribution of ingredients after impregnation in Comparison Preparation Example 3; as shown in FIGS. 11-12, along a radial direction from a core of the carrier to the outer surface of the carrier, the content of the active component is gradually increased and then gradually decreased to form a peak shape distribution, the content of the co-agent component 1 is gradually increased and then gradually decreased to form a peak shape distribution, the content of the co-agent component 2 is gradually increased, but the peak value of the content of the active component is below 0.2 wt %.

Comparative Preparation Example 4

The catalysts were prepared with the same method as Preparation Example 1, except that the impregnation was not performed in a step-by-step manner, but an aqueous solution containing the active ingredient, co-agent component 1, co-agent component 2, and ethanolamine was subjected to an equivalent-volume impregnation with alumina at a pH of 9, then subjected to drying at 80° C. for 150 min, and subsequently subjected to calcining at 500° C. for 3 hours to prepare catalytic oxidation catalyst D4, the composition and structure of the catalyst were shown below.

Figure 13:
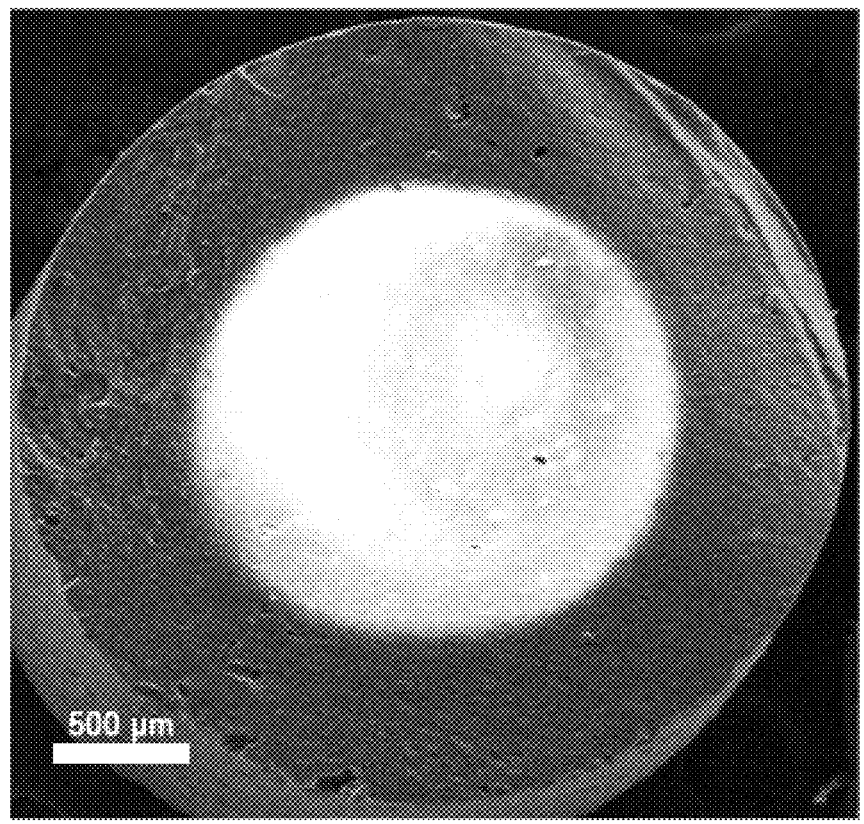
FIG. 13 illustrates a SEM image of the catalytic oxidation catalyst obtained in comparison Preparation Example 4.
Figure 14:
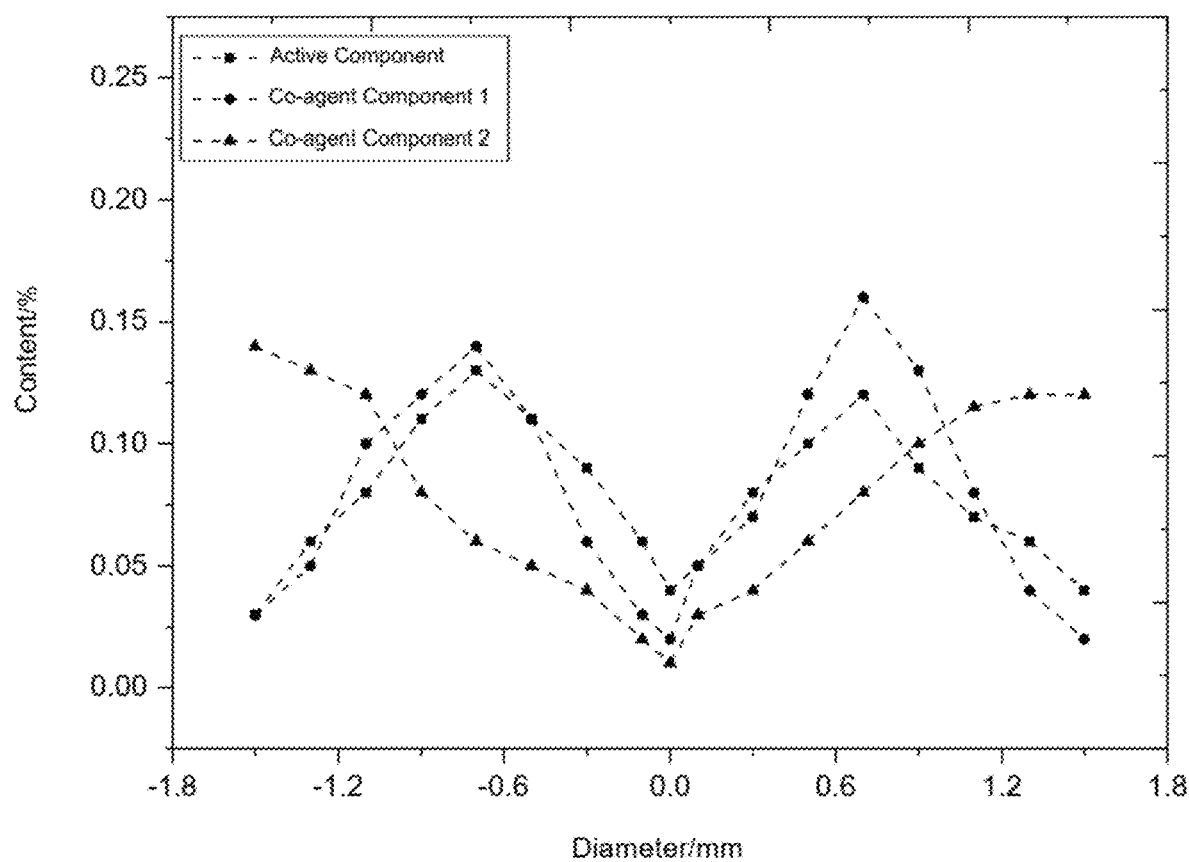
FIG. 14 illustrates a graph showing the content distribution of ingredients after impregnation in comparison Preparation Example 4.

FIG. 13 illustrates a SEM image of the catalytic oxidation catalyst obtained in Comparison Preparation Example 4; FIG. 14 illustrates a graph showing the content distribution of ingredients after impregnation in Comparison Preparation Example 4; as shown in FIGS. 13-14, along a radial direction from a core of the carrier to the outer surface of the carrier, the content of the active component is gradually increased and then gradually decreased to form a peak shape distribution, the content of the co-agent component 1 is gradually increased and then gradually decreased to form a peak shape distribution, the content of the co-agent component 2 is gradually increased, but the peak value of the content of the active component is below 0.2 wt %.

Comparative Preparation 5

The catalysts were prepared with the same method as Preparation Example 1, except that the impregnation process was carried out in two steps. In the first step, an aqueous solution containing active ingredient, co-agent component 1 and ethanolamine was subjected to a first equivalent-volume impregnation with alumina at a pH of 9, and then subjected to drying at 130° C. for 80 min; in the second step, an aqueous solution containing co-agent component 2 selected from the group consisting of alkali metal oxides and alkaline earth metal oxides was subsequently subjected to a second equivalent-volume impregnation at a pH of 10 with alumina obtained after the first equivalent-volume impregnation, and subjected to drying at 170° C. for 100 min. And then subjected to calcining at 500° C. for 3 hours to prepare catalytic oxidation catalyst D5, the composition and structure of the catalyst were shown below.

Figure 15:
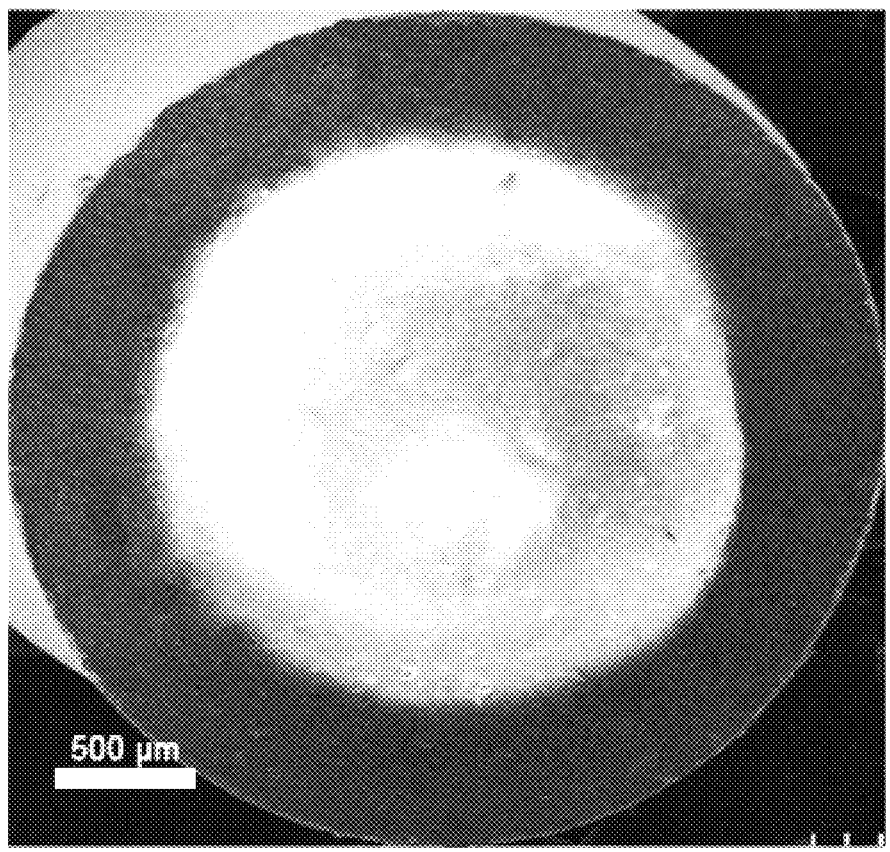
FIG. 15 illustrates a SEM image of the catalytic oxidation catalyst obtained in comparison Preparation Example 5.
Figure 16:
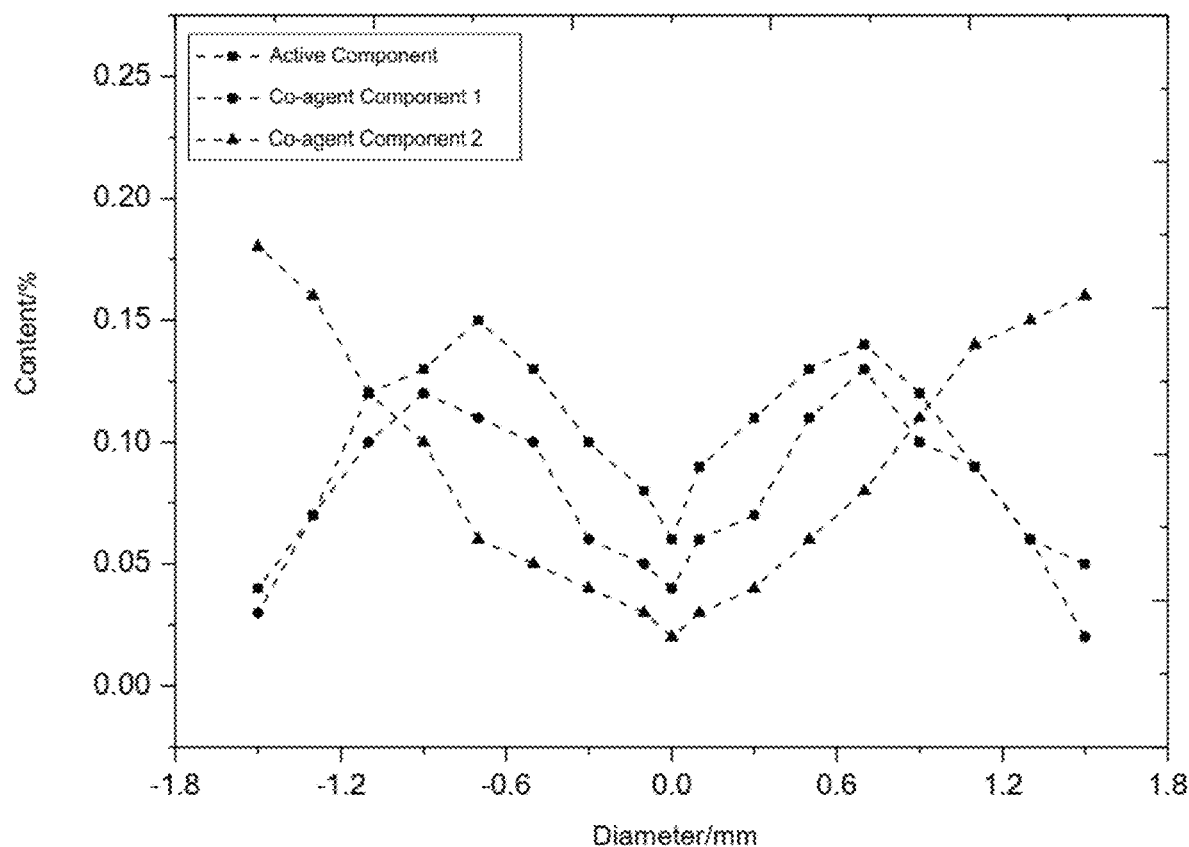
FIG. 16 illustrates a graph showing the content distribution of ingredients after impregnation in Comparison Preparation Example 5.

FIG. 15 illustrates a SEM image of the catalytic oxidation catalyst obtained in Comparison Preparation Example 5; FIG. 16 illustrates a graph showing the content distribution of ingredients after impregnation in Comparison Preparation Example 5; as shown in FIGS. 15-16, along a radial direction from a core of the carrier to the outer surface of the carrier, the content of the active component is gradually increased and then gradually decreased to form a peak shape distribution, the content of the co-agent component 1 is gradually increased and then gradually decreased to form a peak shape distribution, the content of the co-agent component 2 is gradually increased, but the peak value of the content of the active component is below 0.2 wt %.

Catalyst A1: the catalyst containing 0.25 wt % of palladium oxide (based on metal element Pd), 0.1 wt % of ferric oxide, 5.67 wt % of sodium oxide, and the balance being carrier alumina, the catalyst has a specific surface area of 230 m$^2$/g and a pore volume of 0.5 cm$^3$/g; the mesopores with a pore size more than 2 nm and 50 nm or less constitute 28% of the total pore volume, and the macropores with a pore size more than 50 nm and 200 nm or less constitute 70% of the total pore volume; the active component having a dispersion size less than 10 nm is contained in an amount of 93 wt % of the total active component in the catalyst.

Catalyst D1: the catalyst containing 0.25 wt % of palladium oxide (based on metal element Pd), 5.67 wt % of sodium oxide, and the balance being carrier alumina, the catalyst has a specific surface area of 265 m$^2$/g and a pore volume of 0.65 cm$^3$/g; the mesopores with a pore size more than 2 nm and 50 nm or less constitute 45% of the total pore volume, and the macropores with a pore size more than 50 nm and 200 nm or less constitute 53% of the total pore volume; the active component having a dispersion size less than 10 nm is contained in an amount of 25 wt % of the total active component in the catalyst.

Catalyst D2: the catalyst containing 0.25 wt % of palladium oxide (based on metal element Pd), 0.1 wt % of ferric oxide, and the balance being carrier alumina, the catalyst has a specific surface area of 225 m$^2$/g and a pore volume of 0.55 cm$^3$/g; the mesopores with a pore size more than 2 nm and 50 nm or less constitute 30% of the total pore volume, and the macropores with a pore size more than 50 nm and 200 nm or less constitute 68% of the total pore volume; the active component having a dispersion size less than 10 nm is contained in an amount of 45 wt % of the total active component in the catalyst.

Catalyst D3: the catalyst containing 0.25 wt % of palladium oxide (based on metal element Pd), 0.1 wt % of ferric oxide, 5.67 wt % of sodium oxide, and the balance being carrier alumina, the catalyst has a specific surface area of 72 m$^2$/g and a pore volume of 0.5 cm$^3$/g; the mesopores with a pore size more than 2 nm and 50 nm or less constitute 10% of the total pore volume, and the macropores with a pore size more than 50 nm and 200 nm or less constitute 87% of the total pore volume; the active component having a dispersion size less than 10 nm is contained in an amount of 18.5 wt % of the total active component in the catalyst.

Catalyst D4: the catalyst containing 0.25 wt % of palladium oxide (based on metal element Pd), 0.1 wt % of ferric oxide, 5.67 wt % of sodium oxide, and the balance being carrier alumina, the catalyst has a specific surface area of 62 m$^2$/g and a pore volume of 0.75 cm$^3$/g; the mesopores with a pore size more than 2 nm and 50 nm or less constitute 1.5% of the total pore volume, and the macropores with a pore size more than 50 nm and 200 nm or less constitute 97% of the total pore volume; the active component having a dispersion size less than 10 nm is contained in an amount of 6 wt % of the total active component in the catalyst.

Catalyst D5: the catalyst containing 0.25 wt % of palladium oxide (based on metal element Pd), 0.1 wt % of ferric oxide, 5.67 wt % of sodium oxide, and the balance being carrier alumina, the catalyst has a specific surface area of 68 m$^2$/g and a pore volume of 0.73 cm$^3$/g; the mesopores with a pore size more than 2 nm and 50 nm or less constitute 3.8% of the total pore volume, and the macropores with a pore size more than 50 nm and 200 nm or less constitute 95% of the total pore volume; the active component having a dispersion size less than 10 nm is contained in an amount of 9 wt % of the total active component in the catalyst.

Catalyst A2: the catalyst containing 0.2 wt % of palladium oxide (based on metal element Pd), 0.3 wt % of cobalt oxide, 4.89 wt % of sodium oxide, and the balance being carrier alumina, the catalyst has a specific surface area of 195 m$^2$/g and a pore volume of 0.52 cm$^3$/g; the mesopores with a pore size more than 2 nm and 50 nm or less constitute 10% of the total pore volume, and the macropores with a pore size more than 50 nm and 200 nm or less constitute 60% of the total pore volume; the active component having a dispersion size less than 10 nm is contained in an amount of 95 wt % of the total active component in the catalyst.

Catalyst A3: the catalyst containing 0.5 wt % of ruthenium oxide (based on metal element Ru), 0.7 wt % of titanium dioxide, 4.89 wt % of magnesium oxide, and the balance being carrier alumina, the catalyst has a specific surface area of 230 m$^2$/g and a pore volume of 0.5 cm$^3$/g; the mesopores with a pore size more than 2 nm and 50 nm or less constitute 5% of the total pore volume, and the macropores with a pore size more than 50 nm and 200 nm or less constitute 80% of the total pore volume; the active component having a dispersion size less than 10 nm is contained in an amount of 96 wt % of the total active component in the catalyst.

Catalyst A4: the catalyst containing 0.5 wt % of rhodium oxide (based on metal element Rh), 0.7 wt % of titanium dioxide, 4.89 wt % of potassium oxide, and the balance being carrier alumina, the catalyst has a specific surface area of 230 m$^2$/g and a pore volume of 0.5 cm$^3$/g; the mesopores with a pore size more than 2 nm and 50 nm or less constitute 20% of the total pore volume, and the macropores with a pore size more than 50 nm and 200 nm or less constitute 70% of the total pore volume; the active component having a dispersion size less than 10 nm is contained in an amount of 96 wt % of the total active component in the catalyst.

TABLE 1

|  | Example 1 | Example 2 | Example 3 | Example 4 |
| --- | --- | --- | --- | --- |
| Active component | Palladium nitrate | Chloroplatinic acid | Ruthenium nitrate | Rhodium nitrate |
| Co-agent component 1 | Iron nitrate | Cobalt nitrate | Titanium nitrate | Titanium nitrate |
| Co-agent component 2 | Sodium nitrate | Sodium nitrate | Magnesium nitrate | Potassium nitrate |

Test Example 1

The carbon deposits percentage contents by mass of catalysts A1-A4 and D1-D5 were measured in a propylene atmosphere having a pressure of 0.6 MPa at a temperature of 573.15K after the reaction time 100 hours, 1,000 hours and 2,000 hours, respectively, wherein the catalyst was used in an amount of 20 g for 1 mole of propylene, and the results of catalyst carbon deposits are shown in Table 2.

TABLE 2

|    | 100 h | 500 h | 800 h | 1000 h | 1200 h | 1500 h | 1800 h | 2000 h |
|----|-------|-------|-------|--------|--------|--------|--------|--------|
| A1 | 1.49  | 2.43  | 2.80  | 2.99   | 3.17   | 3.39   | 3.58   | 3.69   |
| A2 | 1.48  | 2.45  | 2.81  | 3.00   | 3.15   | 3.38   | 3.57   | 3.68   |
| A3 | 1.50  | 2.42  | 2.79  | 3.01   | 3.19   | 3.40   | 3.59   | 3.70   |
| A4 | 1.50  | 2.41  | 2.80  | 3.00   | 3.16   | 3.41   | 3.58   | 3.68   |
| D1 | 4.50  | 8.32  | 14.69 | 18.12  | 23.06  | —      |        |        |
| D2 | 3.60  | 6.12  | 11.43 | 15.37  | 20.97  | 24.98  | —      |        |
| D3 | 6.70  | 11.95 | 17.58 | 22.65  | 25.36  | —      |        |        |
| D4 | 8.55  | 25.98 | —     | —      |        |        |        |        |
| D5 | 9.03  | 27.32 | —     | —      |        |        |        |        |

Note: the contents are denoted in a unit of mass %.

Test Example 2

The catalysts A1-A4, D1-D5 were subjected to reduction with hydrogen gas under the normal pressure and the temperature of 473.15K for 10 hours, the saturated adsorption amount of oxygen by the catalysts A1-A4 following the reduction process were measured under the temperatures 323.15K, 423.15K and 623.15K, respectively, the results are shown in Table 3. The measurement method of saturated adsorption amount of oxygen was as follows: a chemisorber and a mass spectrometer were used in combination (chemisorber Autochem 2910, mass spectrometer OmniStar), 0.1 g sample was weighted, subjected to reduction with hydrogen gas (mixed gas of 10 vol % hydrogen gas and argon gas) at 200° C. for 2 hours, the heating rate was 10° C./min, the sample was then subjected to purging with high purity helium gas at 200° C. for 0.5 hour, the temperature was then reduced to 50° C. (100° C., 150° C.), after a purging baseline was stabilized, oxygen (mixed gas of 5 vol % oxygen and helium gas) was used for performing pulsed chemisorption to a saturated adsorption state, and a quantitative calculation of adsorption amount was performed to obtain the amount of adsorbed oxygen per gram of catalyst at different temperatures. The ambient pressure in experiments was atmospheric pressure.

TABLE 3

|    | 323.15 K | 350.15 K | 380.15 K | 423.15 K | 450.15 K | 480.15 K | 550.15 K | 623.15 K |
|----|----------|----------|----------|----------|----------|----------|----------|----------|
| A1 | 0.47     | 0.54     | 0.60     | 0.70     | 0.75     | 0.80     | 0.90     | 0.92     |
| A2 | 0.49     | 0.53     | 0.61     | 0.72     | 0.74     | 0.82     | 0.89     | 0.94     |
| A3 | 0.50     | 0.55     | 0.59     | 0.68     | 0.76     | 0.81     | 0.90     | 0.93     |
| A4 | 0.48     | 0.56     | 0.63     | 0.71     | 0.75     | 0.81     | 0.88     | 0.92     |
| D1 | 0.20     | 0.23     | 0.27     | 0.30     | 0.31     | 0.33     | 0.34     | 0.34     |
| D2 | 0.24     | 0.28     | 0.34     | 0.38     | 0.41     | 0.43     | 0.45     | 0.46     |
| D3 | 0.17     | 0.19     | 0.20     | 0.21     | 0.21     | 0.22     | 0.23     | 0.23     |
| D4 | 0.13     | 0.15     | 0.16     | 0.17     | 0.17     | 0.17     | 0.18     | 0.18     |
| D5 | 0.11     | 0.12     | 0.13     | 0.13     | 0.13     | 0.13     | 0.14     | 0.14     |

Note: the unit is mL/g.

Example 1

The treatment of propylene tail gas was carried out by using a catalytic oxidation-deoxidation apparatus for an unsaturated hydrocarbon-containing gas as illustrated in FIG. 1, the propylene tail gas was composed of 8 vol % of oxygen, 90 vol % of propylene and 2 vol % of nitrogen.

The catalytic oxidation-deoxidation apparatus comprised a heat exchange unit 1, a heating unit 2, a deoxygenation reaction unit 3, a temperature reduction unit 4, a gas-liquid separation unit 5 and a hydrocarbon separation unit; wherein heat exchange unit 1 was a heat exchanger for performing heat exchange between an unsaturated hydrocarbon-containing gas and a gas treated by the deoxygenation reaction unit; the heating unit 2 was an electric heater for further heating the unsaturated hydrocarbon-containing gas following the heat exchange in the heat exchange unit 1. The deoxygenation reaction unit 3 was a fixed-bed adiabatic reactor, which was provided with a bed layer of catalyst A1 for catalytic oxidation, so as to subject the unsaturated hydrocarbon-containing gas from the heating unit 2 to the catalytic oxidation, remove oxygen from the unsaturated hydrocarbon-containing gas, thereby obtain the deoxygenated gas B; the temperature reduction unit 4 was an air condenser, which was connected to the heat exchange unit 1 for further cooling down the deoxygenated gas B; the gas-liquid separation unit 5 was a gas-liquid separation tank for separating a liquid phase from a gas phase that has been cooled by the temperature reduction unit 4; the hydrocarbon separation unit was consisting of a compressor 6 and a non-condensable gas separating column 7 for separating at least part of propylene from the gas phase obtained from the gas-liquid separation unit; a tail oxygen analysis unit was arranged in a pipeline connecting the gas-liquid separation unit 5 and the compressor 6 for monitoring the oxygen content of the gas phase obtained from the gas-liquid separation unit 5.

The apparatus was further provided with a circulation branch pipe, which was arranged downstream of a tail oxygen analysis unit of the pipeline connecting the gas-liquid separation unit 5 and the hydrocarbon separation unit, and was connected with an unsaturated hydrocarbon-containing gas ingress pipe, which wa used to return a gas phase obtained from gas-liquid separation unit 5 to the unsaturated hydrocarbon-containing gas ingress pipe disposed before the heat exchange unit 1; the circulation branch pipeline was provided with a circulation regulating valve.

Propylene tail gas at a temperature of 40° C. was introduced into the catalytic oxidation-deoxidation apparatus, and was heated to 110° C. (i.e., the reactor inlet temperature) in a heat exchanger, the propylene tail gas was delivered to a deoxygenation reactor for performing catalytic oxidation-deoxidation reaction with a hourly volumetric space velocity of 10,000 h$^{-1}$, a reaction pressure of 10 MPa, a linear velocity of 0.02 m/s, a product of the pressure and the linear velocity being 0.2 MPa·m/s, and a reactor outlet temperature of 280° C., so as to yield deoxygenated gas B.

The deoxygenated gas B was subjected to heat exchange with the raw material propylene tail gas and heated to 80° C. and then cooled by an air condenser to 20° C., and subsequently entered a gas-liquid separation tank, which separated out a liquid phase produced during the reaction process as waste fluid C, and the separated gas phase had an tail gas oxygen content of 0.10 vol %, a CO selectivity of 0.5%, and a $CO_2$ selectivity of 99.1%. The gas phase was pressurized by compressor 6 and then introduced into non-condensable gas separating column 7, the separated gas phase was non-condensable gas D, and the separated liquid phase was propylene (with a purity of 99.5% or higher). The non-condensable gas D was composed of 50.3 vol % of nitrogen gas, 49.5 vol % of $CO_2$, and 0.2 vol % of CO.

The catalyst carbon deposit amount was measured to be 1.2% after 1,000 h from the start of the reaction, 2.1% after 2,000 h, 2.9% after 3,000 h, 4.1% after 5,000 h, 5.8% after 8,000 h. After 15,060 hours, the tail gas oxygen content in the separated gas phase was measured to be 0.28% by volume, the carbon deposit amount was 9.8%, indicating that the catalyst was deactivated, the reaction apparatus was shut down, and it was necessary to combust the carbon deposit and regenerate the catalyst.

Example 2

The treatment of propyne tail gas was carried out by using a catalytic oxidation-deoxidation apparatus for an unsaturated hydrocarbon-containing gas as illustrated in FIG. 1, the catalyst is catalytic oxidation catalyst A2.

The propyne tail gas was composed of 7 vol % of oxygen, 88 vol % of propyne and 3 vol % of nitrogen. The propyne tail gas at a temperature of 40° C. was introduced into the catalytic oxidation-deoxidation apparatus, and was heated to 200° C. (i.e., the reactor inlet temperature) in a heat exchanger, the propyne tail gas was delivered to a deoxygenation reactor for performing catalytic oxidation-deoxidation reaction with a hourly volumetric space velocity of 5,000 h$^{-1}$, a pressure of 5 MPa, a linear velocity of 0.2 m/s, a product of the pressure and the linear velocity being 1 MPa·m/s, and a reactor outlet temperature of 350° C., so as to yield deoxygenated gas B2. The deoxygenated gas B2 was subjected to heat exchange with the raw material propyne tail gas and heated to 110° C. and then cooled by an air condenser to 20° C., and subsequently entered a gas-liquid separation tank, which separated out a liquid phase produced during the reaction process as waste fluid C, and the separated gas phase had an tail gas oxygen content of 0.13 vol %, a CO selectivity of 0.06%, and a $CO_2$ selectivity of 99.0%. The gas phase was pressurized by the compressor and then introduced into the non-condensable gas separating column, the separated gas phase was non-condensable gas, and the separated liquid phase was propyne (with a purity of 99.6% or higher). The non-condensable gas was composed of 5.8 vol % of nitrogen gas, 94 vol % of $CO_2$, and 0.2 vol % of CO.

The catalyst carbon deposit amount was measured to be 1.3% after 1,000 h, 2.0% after 2,000 h, 3.1% after 3,000 h, 4.6% after 5,000 h, 6.2% after 8,000 h from the start of the reaction. After 16,100 hours of reaction duration, the tail gas oxygen content in the separated gas phase was measured to be 0.28% by volume, the carbon deposit amount was 10.5%, indicating that the catalyst was deactivated, the reaction apparatus was shut down, and it was necessary to combust the carbon deposit and regenerate the catalyst.

Example 3

The catalytic oxidation-deoxidation was carried out according to the same method as Example 1, except that the catalyst in use was catalytic oxidation catalyst A3, the reaction space velocity was 500 h$^{-1}$, the pressure was 0.4 MPa, the linear velocity was 5 m/s, the product of the pressure and linear velocity was 2 MPa·m/s. The catalyst carbon deposit amount was measured to be 1.0% after 1,000 h, 1.8% after 2,000 h, 2.7% after 3,000 h, 3.9% after 5,000 h, 5.85% after 8,000 h from the start of the reaction. After 17,500 hours of reaction duration, the tail gas oxygen content in the separated gas phase was measured to be 0.28% by volume, the carbon deposit amount was 11.9%, indicating that the catalyst was deactivated, the reaction apparatus was shut down, and it was necessary to combust the carbon deposit and regenerate the catalyst.

Example 4

The catalytic oxidation-deoxidation was carried out according to the same method as Example 1, except that the catalyst in use was catalytic oxidation catalyst A4, the linear velocity was 0.5 m/s. The catalyst carbon deposit amount was measured to be 1.25% after 1,000 h, 2.0% after 2,000 h, 2.85% after 3,000 h, 4.7% after 5,000 h, 7.1% after 8,000 h from the start of the reaction. After 14,500 hours of reaction duration, the tail gas oxygen content in the separated gas phase was measured to be 0.28% by volume, the carbon deposit amount was 11%, indicating that the catalyst was deactivated, the reaction apparatus was shut down, and it was necessary to combust the carbon deposit and regenerate the catalyst.

Comparative Example 1

The catalytic oxidation-deoxidation was carried out according to the same method as Example 1, except that the linear velocity was 0.01 m/s, the product of the pressure and linear velocity was 0.1 MPa·m/s, and the catalyst carbon deposit amount was measured to be 16% after 1,000 h from the start of the reaction.

Comparative Example 2

The catalytic oxidation-deoxidation was carried out according to the same method as Example 1, except that the linear velocity was 11 m/s, the product of the pressure and linear velocity was 55 MPa·m/s, and the catalyst carbon deposit amount was measured to be 12% after 1,000 h from the start of the reaction.

Comparative Example 3

The catalytic oxidation-deoxidation was carried out according to the same method as Example 1, except that the pressure was 21 MPa, the product of the pressure and linear velocity was 0.42 MPa·m/s, and the catalyst carbon deposit amount was measured to be 15% after 1,000 h from the start of the reaction.

Comparative Example 4

The catalytic oxidation-deoxidation was carried out according to the same method as Example 1, except that catalyst A1 was replaced with catalyst D1, and the catalyst carbon deposit amount was measured to be 4.5% after 1,000 h from the start of the reaction.

Comparative Example 5

The catalytic oxidation-deoxidation was carried out according to the same method as Example 1, except that catalyst A1 was replaced with catalyst D2, and the catalyst carbon deposit amount was measured to be 3.6% after 1,000 h from the start of the reaction.

Comparative Example 6

The catalytic oxidation-deoxidation was carried out according to the same method as Example 1, except that catalyst A1 was replaced with catalyst D3, and the catalyst carbon deposit amount was measured to be 6.8% after 1,000 h from the start of the reaction.

Comparative Example 7

The catalytic oxidation-deoxidation was carried out according to the same method as Example 1, except that catalyst A1 was replaced with catalyst D4, and the catalyst carbon deposit amount was measured to be 9.1% after 1,000 h from the start of the reaction.

Comparative Example 8

The catalytic oxidation-deoxidation was carried out according to the same method as Example 1, except that catalyst A1 was replaced with catalyst D5, and the catalyst carbon deposit amount was measured to be 10.2% after 1,000 h from the start of the reaction.

The above content in combination with the appended figures describe in detail the preferred embodiments of the present disclosure, but the present disclosure is not limited thereto. A variety of simple modifications can be implemented in regard to the technical solutions of the present disclosure within the scope of the technical concept of the present disclosure, including a combination of individual technical features in any suitable manner. The possible combinations of the various technical features are not further described in the present disclosure in order to avoid unnecessary repetition. However, such simple modifications and combinations thereof shall also to be regarded as the content described by the present disclosure, each of them falls into the protection scope of the present disclosure.

The invention claimed is:

1. A catalyst comprising a carrier, as well as an active component, and a first co-agent component and a second co-agent component loaded on the carrier, wherein:
   the active component is one or more selected from the group consisting of oxides of Pt, Pd, Ru, Rh, Ag, and Ir;
   the first co-agent component comprises one or more selected from the group consisting of a rare-earth metal element, a group IVB metal element, and a group VIII metal element; and
   the second co-agent component comprises one or more selected from the group consisting of an alkali metal element and an alkaline-earth metal element;
   along a radial direction from a core of the carrier to an outer surface of the carrier, the content of said active component increases to a first peak value and then decreases to form a peak shape distribution, the content of said first co-agent component increases to a second peak value and then decreases to form a peak shape distribution, the content of said second co-agent component increases, and the first peak value is 0.2 wt % or more; and
   said active component is present in an amount of 0.05-2 wt % in terms of the metallic element, said first co-agent component is present in an amount of 0.1-3 wt % in terms of oxides thereof, and said second co-agent component is present in an amount of 1-7 wt % in terms of oxides thereof, based on the dry weight of the catalyst.

2. The catalyst of claim 1, wherein, measured in a propylene atmosphere at a pressure of 0.6 MPa and a temperature of 573.15 K, the catalyst has a content of carbon deposit of $$y=0.9y1-1.1y1,$$

wherein:

$$y1=(-0.0029+0.3748 \times t^{0.3013})/100,$$

y is the content of the carbon deposit by mass and is in a range of 0.2% or less, and
t is a reaction time and is in a range of 100-2000 h.

3. The catalyst of claim 2, wherein, after hydrogen reduction under a normal pressure and a temperature of 473.15 K, an amount of oxygen adsorbed on the catalyst at saturation is:

$$q=0.8q1-1.2q1, \text{ wherein:}$$

$$q1=a+b \times T^c+d \times T^e,$$

q is the saturated adsorption amount of oxygen at a unit of mL/g;
T is an adsorption temperature and is within a range of 323.15-623.15K;
$a=-0.0685$; $b=7.016 \times 10^{-6}$; $c=2.06$; $d=-5.83 \times 10^{-8}$; and $e=2.76$.

4. The catalyst of claim 1, wherein the first co-agent component comprises one or more selected from the group consisting of a group IVB metal element and a group VIII metal element, and the second co-agent component comprises an alkali metal element.

5. The catalyst of claim 4, wherein the first co-agent component is one or more selected from the group consisting of ferric oxide, cobalt oxide, nickel oxide, and titanium oxide, and the second co-agent component is sodium oxide.

6. The catalyst of claim 4, wherein a weight ratio of the first co-agent component to the second co-agent component is 1:20-220.

7. The catalyst of claim 4, wherein the carrier is one or more selected from the group consisting of alumina, silica, titania, molecular sieves, and carbon nanotubes.

8. The catalyst of claim 1, wherein the catalyst has:
a specific surface area of 100-260 m$^2$/g and a total pore volume of 0.2-0.7 cm$^3$/g;
mesopores with a pore size ranging from 2 nm to 50 nm constitute 2-40% of the total pore volume; and
macropores with a pore size ranging from 50 nm to 200 nm constitute 50-90% of the total pore volume.

9. The catalyst of claim 1, wherein a content of the active component having a dispersion size of less than 10 nm is 80 wt % or more of the amount of the active component.

10. A catalytic oxidation-deoxidation method for an unsaturated hydrocarbon, comprising:

S1: contacting a gaseous mixture comprising the unsaturated hydrocarbon and oxygen with the catalyst of claim 1 in a reactor to remove oxygen from the gaseous mixture, wherein the gaseous mixture has a hourly volumetric space velocity of 200-50,000 $h^{-1}$, a pressure of 0.01-20 MPa, a linear velocity of 0.02-10 m/s, and wherein a product of the pressure and the linear velocity is within a range of 0.1-5 MPa·m/s.

11. The catalytic oxidation-deoxidation method of claim 10, wherein the gaseous mixture has a hourly volumetric space velocity of 500-20,000 $h^{-1}$, a pressure of 0.4-10 MPa, a linear velocity of 0.02-5 m/s, and a product of the pressure and the linear velocity is within a range of 0.2-5 MPa·m/s.

12. The catalytic oxidation-deoxidation method of claim 11, wherein the gaseous mixture hourly volumetric space velocity is 500-10,000 $h^{-1}$.

13. The catalytic oxidation-deoxidation method of claim 10, wherein the method further comprises:

S2: subjecting a product gas obtained from S1 to a temperature reduction and a gas-liquid separation;

S3: separating a gas phase obtained from to obtain the unsaturated hydrocarbon.

14. The catalytic oxidation-deoxidation method of claim 10, wherein the method further comprises prior to S1, performing heat exchange between the gaseous mixture and the gas phase obtained from S2.

15. The catalytic oxidation-deoxidation method of claim 10, wherein the unsaturated hydrocarbon comprises unsaturated hydrocarbons of C4 or fewer carbon atoms.

16. The catalytic oxidation-deoxidation method of claim 15, wherein the unsaturated hydrocarbon comprises one or more selected from the group consisting of ethylene, propylene, 1-butene, 2-butene, isobutylene, 1,3-butadiene, acetylene, propyne, 1-butyne, and 2-butyne.

17. The catalytic oxidation-deoxidation method of claim 10, wherein the reactor has an inlet and an outlet, and an inlet temperature of the reactor inlet is within a range of 60-400° C., an outlet temperature of the reactor outlet is within a range of 100-600° C.

18. The catalytic oxidation-deoxidation method of claim 17, further comprising an interlock-start alarm step, wherein the interlock-start alarm step comprises determining whether the reactor inlet temperature, the reactor outlet temperature, a feed gas oxygen content at the reactor inlet, or a tail gas oxygen content at the reactor outlet reach the corresponding alarm value or interlock value, and performing alarm interlock control accordingly.

19. The catalytic oxidation-deoxidation method of claim 18, wherein a low alarm value of the reactor inlet temperature is 60-90° C., a low interlock value of the reactor inlet temperature is 40-60° C., la high alarm value of the reactor outlet temperature is 580-610° C., a high interlock value of the reactor outlet temperature is 610-650° C., a high alarm value of the feed gas oxygen content is 7.5-8.5% by volume, a high interlock value of the feed gas oxygen content is 8.5-10% by volume, and a high alarm value of the tail gas oxygen content is 0.2-0.3% by volume.

20. The catalytic oxidation-deoxidation method of claim 10, wherein the gaseous mixture comprises 0.2-8% of oxygen and 5-99% of unsaturated hydrocarbon by volume.

* * * * *